US012660847B2

(12) United States Patent
Jeoung

(10) Patent No.: US 12,660,847 B2
(45) Date of Patent: Jun. 23, 2026

(54) HEAT CONDUCTING WRAPPER FOR CARBON HEAT SOURCE-APPLIED CIGARETTE AND CIGARETTE INCLUDING THE SAME

(71) Applicant: KT&G CORPORATION, Daejeon (KR)

(72) Inventor: Eun Mi Jeoung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 453 days.

(21) Appl. No.: 18/035,015

(22) PCT Filed: Nov. 16, 2022

(86) PCT No.: PCT/KR2022/018033
§ 371 (c)(1),
(2) Date: May 2, 2023

(87) PCT Pub. No.: WO2023/090834
PCT Pub. Date: May 25, 2023

(65) Prior Publication Data
US 2024/0341346 A1     Oct. 17, 2024

(30) Foreign Application Priority Data

Nov. 16, 2021     (KR) ........................ 10-2021-0157720

(51) Int. Cl.
| | |
|---|---|
| *A24D 1/02* | (2006.01) |
| *A24D 1/22* | (2020.01) |
| *B32B 3/26* | (2006.01) |
| *B32B 15/12* | (2006.01) |
| *B32B 15/20* | (2006.01) |

(52) U.S. Cl.
CPC ................. *A24D 1/02* (2013.01); *A24D 1/22* (2020.01); *B32B 3/266* (2013.01); *B32B 15/12* (2013.01); *B32B 15/20* (2013.01); *B32B 2307/302* (2013.01); *B32B 2307/304* (2013.01); *B32B 2307/7376* (2023.05)

(58) Field of Classification Search
None
See application file for complete search history.

(56) References Cited

U.S. PATENT DOCUMENTS 4,966,171 A * 10/1990 Serrano ................ A24B 15/165
131/194

FOREIGN PATENT DOCUMENTS

| | | |
|---|---|---|
| EP | 2 893 822 A1 | 7/2015 |
| JP | 2002-500032 A | 1/2002 |
| JP | WO2011/118024 A1 | 9/2011 |
| JP | 6526672 B2 | 6/2019 |

(Continued)

OTHER PUBLICATIONS

English machine translation of WO 2011118024 A1 to Tsuruizumi; 14 pages; CPC A61M11/047. (Year: 2011).*

(Continued)

*Primary Examiner* — Linda L Gray
(74) *Attorney, Agent, or Firm* — Sughrue Mion, PLLC

(57) ABSTRACT

Provided are a heat conducting wrapper for a carbon heat source-applied cigarette, in which the wrapper is triply laminated paper including a first insulating layer, a metal layer, and a second insulating layer, and a carbon heat source-applied cigarette including the wrapper.

8 Claims, 22 Drawing Sheets

(56) References Cited

FOREIGN PATENT DOCUMENTS

| | | | |
|---|---|---|---|
| JP | 2019-531086 | A | 10/2019 |
| JP | 6820990 | B2 | 1/2021 |
| KR | 10-2018-0044407 | A | 5/2018 |
| KR | 10-2019-0053838 | A | 5/2019 |
| KR | 10-2019-0120413 | A | 10/2019 |
| KR | 10-2021-0081409 | A | 7/2021 |
| KR | 10-2021-0111067 | A | 9/2021 |
| WO | 99/34697 | A1 | 7/1999 |
| WO | 2009/022232 | A2 | 2/2009 |
| WO | 2019/048361 | A1 | 3/2019 |
| WO | 2020/089799 | A1 | 5/2020 |

OTHER PUBLICATIONS

English machine translation of WO 20190053838 to Malgat; May 20, 2019; 13 pages; A24D1/02. (Year: 2019).*
International Search Report for PCT/KR2022/018033 dated Feb. 22, 2023 (PCT/ISA/210).
Extended European Search Report dated May 8, 2024, issued in European Application No. 22893962.5.
Communication dated Jun. 18, 2024, issued in Japanese Application No. 2023-528991.

* cited by examiner

Front
surface

Side
surface

FIG. 27

HEAT CONDUCTING WRAPPER FOR CARBON HEAT SOURCE-APPLIED CIGARETTE AND CIGARETTE INCLUDING THE SAME

CROSS REFERENCE TO RELATED APPLICATIONS

This application is a National Stage of International Application No. PCT/KR2022/018033 filed Nov. 16, 2022, claiming priority based on Korean Patent Application No. 10-2021-0157720 filed Nov. 16, 2021.

TECHNICAL FIELD

The present disclosure relates to a heat conducting wrapper for a carbon heat source-applied cigarette and a cigarette including the same.

BACKGROUND ART

Recently, a plurality of smoking articles in which tobacco is heated rather than combusted has been proposed. Unlike conventional smoking articles, these non-combusted smoking articles are used by inhaling an aerosol generated by heating a tobacco medium without burning the tobacco medium. As one of types of heated smoking articles, there is a tobacco article to which a carbon heat source is applied.

The tobacco to which the carbon heat source is applied generates an aerosol by heat transfer from the carbon heat source to the tobacco medium located downstream of the carbon heat source.

The tobacco article to which the carbon heat source is applied has a smoking form similar to that of traditional tobacco, unlike general heated electronic cigarettes using a dedicated device, so that it can be expected to improve consumers' smoking convenience and satisfaction.

RELATED ART DOCUMENT

Patent Document (Patent Document 1) WO2009/022232 (2009 Feb. 19)

DISCLOSURE OF THE INVENTION

Technical Goals

An object of the present disclosure is to provide a heat conducting wrapper capable of effectively transferring heat and a carbon heat source optimized to enable effective heat transfer of a cigarette to which a carbon heat source is applied, and a cigarette including the same.

Technical Solutions

According to an embodiment of the present disclosure, there is provided a heat conducting wrapper for a carbon heat source-applied cigarette, in which the wrapper is triply laminated paper including a first insulating layer, a metal layer, and a second insulating layer.

In an embodiment of the present disclosure, the insulating layer may be made of a paper material, and the metal layer may be made of an aluminum material.

According to another embodiment of the present disclosure, there is provided a carbon heat source-applied cigarette including:

a carbon heat source, a medium, a heat conducting wrapper wrapping the carbon heat source and a part of the medium, and cigarette paper wrapping the rest of the medium, an outer cover surrounding the heat conducting wrapper and elements except for the heat conducting wrapper at a time, and a barrier formed between the carbon heat source and the medium, in which the heat conducting wrapper is triply laminated paper including a first insulating layer, a metal layer, and a second insulating layer.

In another embodiment of the present disclosure, in the heat conducting wrapper, a ratio of a length of a front portion wrapping the carbon heat source and a length of a rear portion wrapping the medium may be 1:1.1 to 3.

In yet another embodiment of the present disclosure, the length of the rear portion may be longer than the length of the front portion.

In yet another embodiment of the present disclosure, perforations may be formed in an outer circumferential surface of the medium portion.

In yet another embodiment of the present disclosure, the perforations may be formed in positions between 0.5 to 3 mm from the barrier.

In yet another embodiment of the present disclosure, the heat source may have a length of 5 to 15 mm, and the cigarette paper may have a length of 3 to 8 mm.

In yet another embodiment of the present disclosure, the barrier may have a thickness of 0.1 to 0.3 mm.

Effects

According to the embodiments of the present disclosure, the heat conducting wrapper and the cigarette including the same are optimized to enable efficient heat transfer and efficient nicotine transfer.

BRIEF DESCRIPTION OF DRAWINGS

FIG. 27 is a diagram illustrating results of confirming a total amount of nicotine yield for each perforation position condition (nicotine numbers represent peak numbers from a TG-FTIR experiment).

BEST MODE FOR CARRYING OUT THE INVENTION

The demand for heated electronic cigarettes is increasing. Most heated electronic cigarettes include a device with a [device+exclusive stick] structure, and as a new type of cigarette, an article having a similar smoking form to general cigarettes by applying a carbon-based heat source on a cigarette tip. Accordingly, the present inventors designed a carbon heat source-applied cigarette by confirming a heat transfer phenomenon between the heat source and the medium capable of having a smoking form (ignition, a starting point of smoking) similar to general cigarettes and implementing excellent smoking taste and atomizing amount in early smoking and then completed the present disclosure.

Therefore, the present disclosure provides a heat conducting wrapper for a carbon heat source-applied cigarette, in which the wrapper is triply laminated paper including a first insulating layer, a metal layer, and a second insulating layer.

In addition, the present disclosure provides a carbon heat source-applied cigarette, and the cigarette includes a carbon heat source, a medium, a heat conducting wrapper wrapping the carbon heat source and a part of the medium, and cigarette paper wrapping the rest of the medium, and includes an outer cover surrounding the heat conducting wrapper and elements except for the heat conducting wrapper at a time, and a barrier formed between the carbon heat source and the medium, in which the heat conducting wrapper is triply laminated paper including a first insulating layer, a metal layer, and a second insulating layer.

Hereinafter, the present disclosure will be described in more detail.

Figure 1:
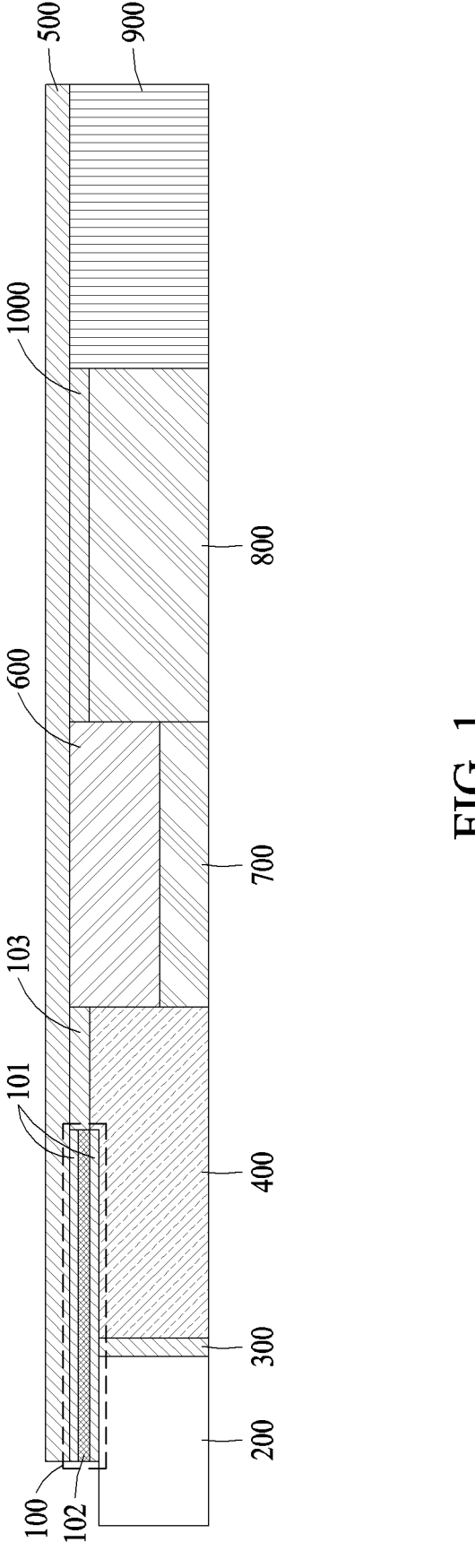
FIG. 1 is a diagram illustrating a configuration of a carbon heat source-applied cigarette of the present disclosure.

As illustrated in FIG. 1, the present disclosure provides a heat conducting wrapper 100 for a carbon heat source-applied cigarette, and the wrapper is triply laminated paper including a first insulating layer 101, a metal layer 102, and a second insulating layer 101. In the wrapper, the insulation layer is made of a paper material and the metal layer is made of an aluminum material. In conventional cigarette articles, as the heat conducting wrapper, an aluminum material was used and a material mixed with paper and aluminum materials was also used. However, doubly laminated paper used in the conventional articles has a problem in which the carbon heat source is eliminated from the cigarette due to the lack of friction with the carbon heat source. On the other hand, the carbon heat source may be provided stably inside the cigarette by using the heat conducting wrapper having a triply laminated paper structure capable of preventing the elimination of the carbon heat source.

In addition, as illustrated in FIG. 1, the present disclosure provides a carbon heat source-applied cigarette, and the cigarette includes a carbon heat source 200, a medium 400, and a heat conducting wrapper 100 wrapping the carbon heat source 200 and a part of the medium 400, and cigarette paper 103 wrapping the rest of the medium, and includes an outer cover 500 collectively surrounding the heat conducting wrapper and elements other than the heat conducting wrapper, and a barrier 300 formed between the carbon heat source and the medium.

Figure 2:
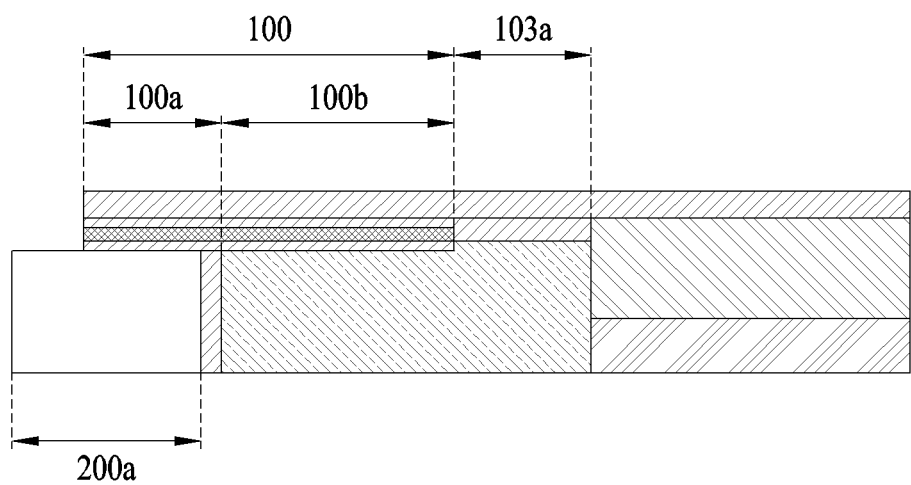
FIG. 2 is a diagram illustrating a configuration related to the length of a heat conducting wrapper in the cigarette of the present disclosure.

Referring to FIG. 2, in the heat conducting wrapper, a ratio of a length 100a of a front portion wrapping the carbon heat source and a length 100b of a rear portion wrapping the medium may be 1:1.1 to 3. The ratio is designed through the results of the embodiment of the present disclosure, and preferably may be 1:1.1 to 2, but if the length of the rear portion is designed to be longer than the length of the front portion, the ratio is not limited to the value. The heat transfer to the medium may be performed efficiently by increasing the length of the rear portion.

In the carbon heat source-applied cigarette, the barrier surrounding the tobacco medium and the heat conducting element are the main heat sources, and during smoking, the temperature of the medium rapidly decreases due to the air flowing into the cigarette, but the heat transfer by the rear portion and the barrier increases, and since the heat of the medium moves to the rear portion of the medium due to the airflow flowing into the medium, the heat transfer amount rapidly increases. In an Interpuff time at which smoking is not performed, the medium is mainly heated by the barrier in direct contact with the carbon heat source, and some of the heat is discharged to the triply laminated paper. While the smoking is in progress, both the barrier and the rear portion of the triply laminated paper are heating elements, and the cigarette paper serves to emit the heat, and in the Iterpuff, which is the time between smoking and smoking, only one of the barrier and the rear portion of the triply laminated paper serves as a heating element, and the rest thereof and the cigarette paper serve to emit the heat. Accordingly, in the present disclosure, the temperature of the front portion is reduced by increasing the length of the rear portion, and the nicotine yield amount is increased by increasing the temperature of the rear portion.

As an embodiment of the present disclosure, the heat source means a solid combustible heat source containing carbon. The heat source has a substantially cylindrical shape, and a length 200a of the heat source has a length of 5 to 15 mm.

In addition, in the present disclosure, in the cigarette paper, a length 103a of the cigarette paper may have a length of 3 to 8 mm, but may be freely changed according to the shape and size of an article to be manufactured.

The cigarette of the present disclosure includes a non-combustible, substantially air-impermeable barrier between the end surface in the downstream direction of the carbon heat source and the medium. This may help avoid or reduce combusting or thermal degradation of the medium during use of the cigarette.

Figure 3:
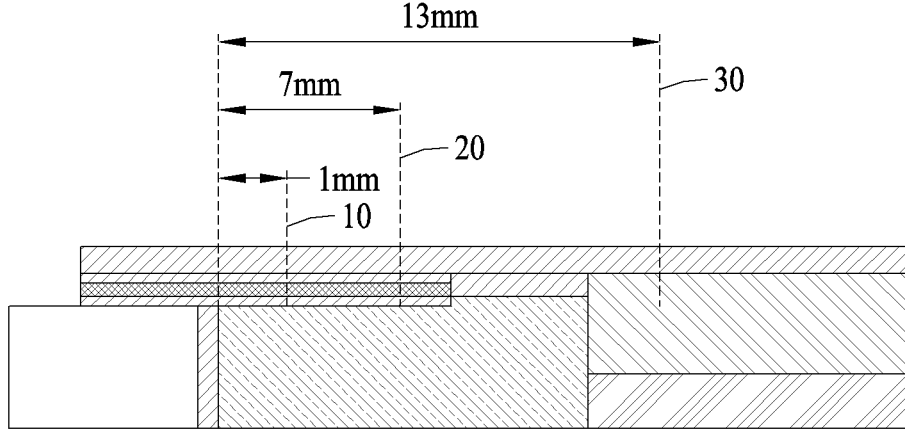
FIG. 3 is a diagram illustrating a position-related configuration of the perforation in the cigarette of the present disclosure.

In addition, referring to FIG. 3, the cigarette of the present disclosure may have perforations 10, 20, and 30 formed on an outer circumferential surface of the medium portion. The position of the perforation may be changed, but it is preferable that the perforations are formed at positions between 0.5 and 3 mm from the barrier, and as illustrated in FIG. 3, the perforation may be formed at a position (10). Perforations may also be formed at positions of 0.5 to 1.5 mm from the upstream end (end of the barrier) of the medium, but are not limited thereto.

Referring to FIG. 1, in addition to the above-mentioned components, the cigarette may further include a tube filter 600, a first fluid 700, a second fluid 800, an ace filter 900, and a paper pipe 1000.

The medium 400 may also be formed of a sheet or a strand. The medium may also be formed of cut tobacco in which tobacco sheets are chopped. The medium may contain other additive materials such as flavoring agents, wetting agents, and/or organic acids, and flavoring liquids such as menthol or a humectant may be sprayed and added into the medium portion.

The cigarette may include filter elements such as the tube filter 600 and the ace filter 900, and the ace filter 900 may be a cellulose acetate filter. On the other hand, the shape of the filter is not limited. For example, the filter may also be a cylindrical type rod, or a tubular type rod including a hollow therein. Also, the filter may be a recess type rod. If the filter consists of a plurality of segments, at least one of the plurality of segments may also be formed in a different shape. The filter may also be formed to generate flavor. As an example, a flavoring liquid may also be sprayed onto the filter, and a separate fiber coated with the flavoring liquid may also be inserted into the filter.

Also, the filter may include at least one capsule. Here, the capsule may perform a function of generating a flavor or also perform a function of generating an aerosol. For example, the capsule may have a structure in which a liquid containing a fragrance is wrapped with a film. The capsule may have a spherical or cylindrical shape, but is not limited thereto.

In addition, the cigarette may contain a fluid for cooling inside the cigarette. The fluid is also referred to as a cooling segment, and may be made of a polymer material or a biodegradable polymer material. For example, the cooling segment may be made of only pure polylactic acid, but is not limited thereto. Alternatively, the cooling segment may be made of cellulose acetate perforated with a plurality of holes. However, the cooling segment is not limited to the examples, and may be applicable without limitation as long as the cooling segment may perform a function of cooling the aerosol. In addition, the paper pipe may be included to support the fluid portion.

The final outer cover 500 is paper surrounding all of the triple laminated paper, the cigarette paper, the tube filter, the fluid, and the ace filter, and may be made of a paper material, and the final outer cover 500 may be formed by coating at least one of a filler, ceramic, silicon carbide, sodium citrate, potassium citrate, aramid fiber, nanocellulose, and SWNT, but is not limited to the range.

Hereinafter, embodiments will be described in detail with reference to the accompanying drawings. However, since various modifications may be made to the embodiments, the scope of the present disclosure is not limited or restricted by these embodiments. It should be understood that all modifications, equivalents, and substitutes for the embodiments are included in the scope of the present disclosure.

The terms used in the embodiments are used for the purpose of description only, and should not be construed to be limited. The singular expression includes the plural expression unless the context clearly dictates otherwise. In the present specification, it should be understood that term "comprising" or "having" indicates that a feature, a number, a step, an operation, a component, a part, or the combination thereof described in the specification is present, but does not exclude a possibility of presence or addition of one or more other features, numbers, steps, operations, components, parts, or combinations thereof, in advance.

Unless otherwise contrarily defined, all terms used herein including technological or scientific terms have the same meanings as those generally understood by a person with ordinary skill in the art to which embodiments pertain. Terms which are defined in a generally used dictionary should be interpreted to have the same meaning as the meaning in the context of the related art, and are not interpreted as ideal or excessively formal meanings unless otherwise defined in the present application.

In addition, in the description with reference to the accompanying drawings, like components designate like reference numerals regardless of reference numerals and a duplicated description thereof will be omitted. In describing the embodiments, a detailed description of related known technologies will be omitted if it is determined that they unnecessarily make the gist of the embodiments unclear.

Embodiment

In Embodiment, a 3D computational analysis model of a cigarette was prepared to determine a heat transfer mechanism between a carbon heat source and a medium. In order to improve the accuracy of the model, an experimental temperature distribution of the carbon heat source was reflected to the model, and a medium temperature according to a shape change was derived. As a result, the amounts of nicotine and tar produced in the medium were predicted.

1. 3D Computational Analysis of Cigarette

Figure 4:
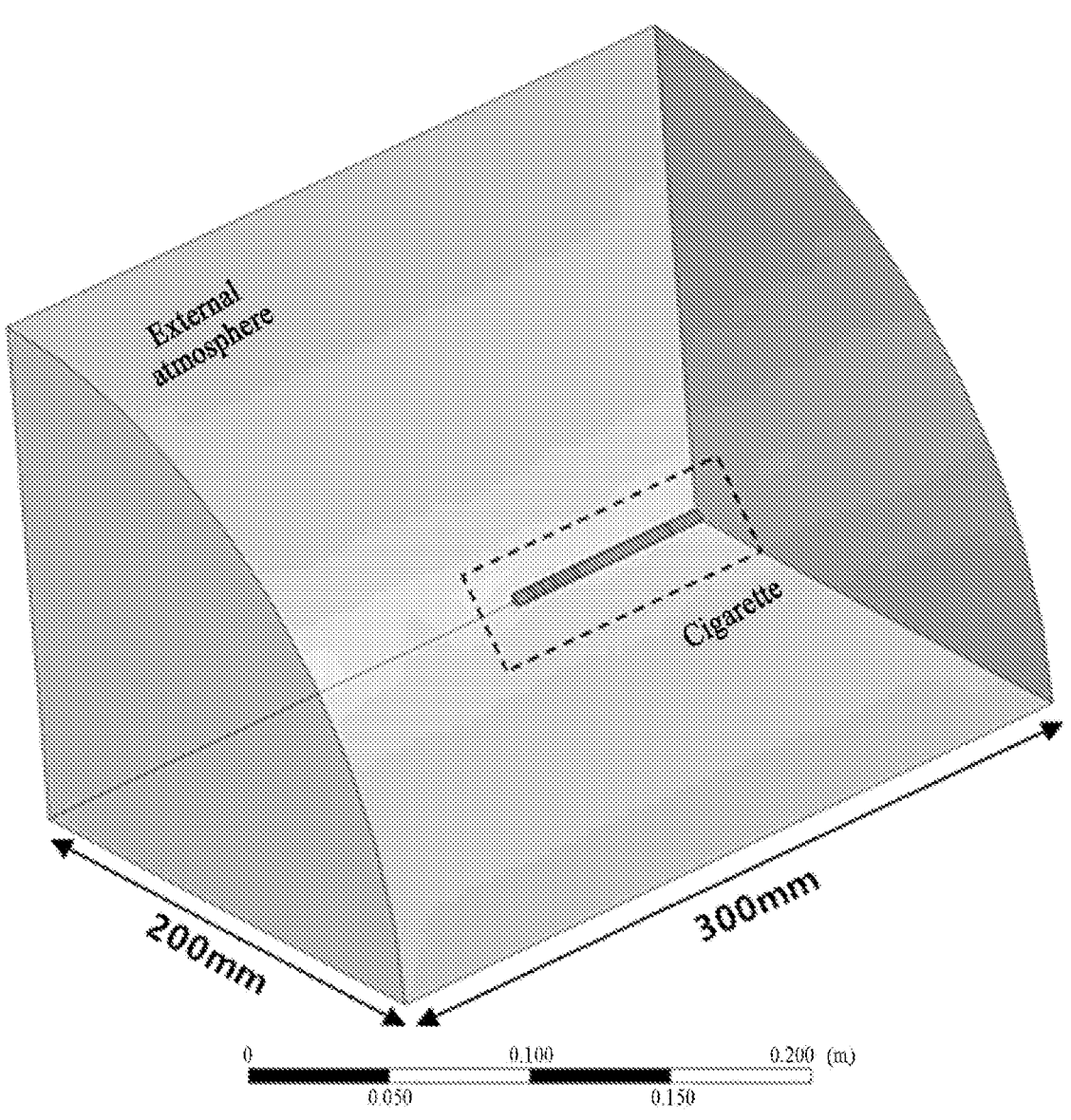
FIG. 4 is a diagram illustrating an area of computational analysis performed in an embodiment of the present disclosure.

The 3D shape and grid of the cigarette for computational analysis were prepared using Fluent/Gambit (FIG. 4). Since the shape was axisymmetric, Symmetry conditions were used for a symmetry plane after drawing only a ¼ area.

Figure 5:
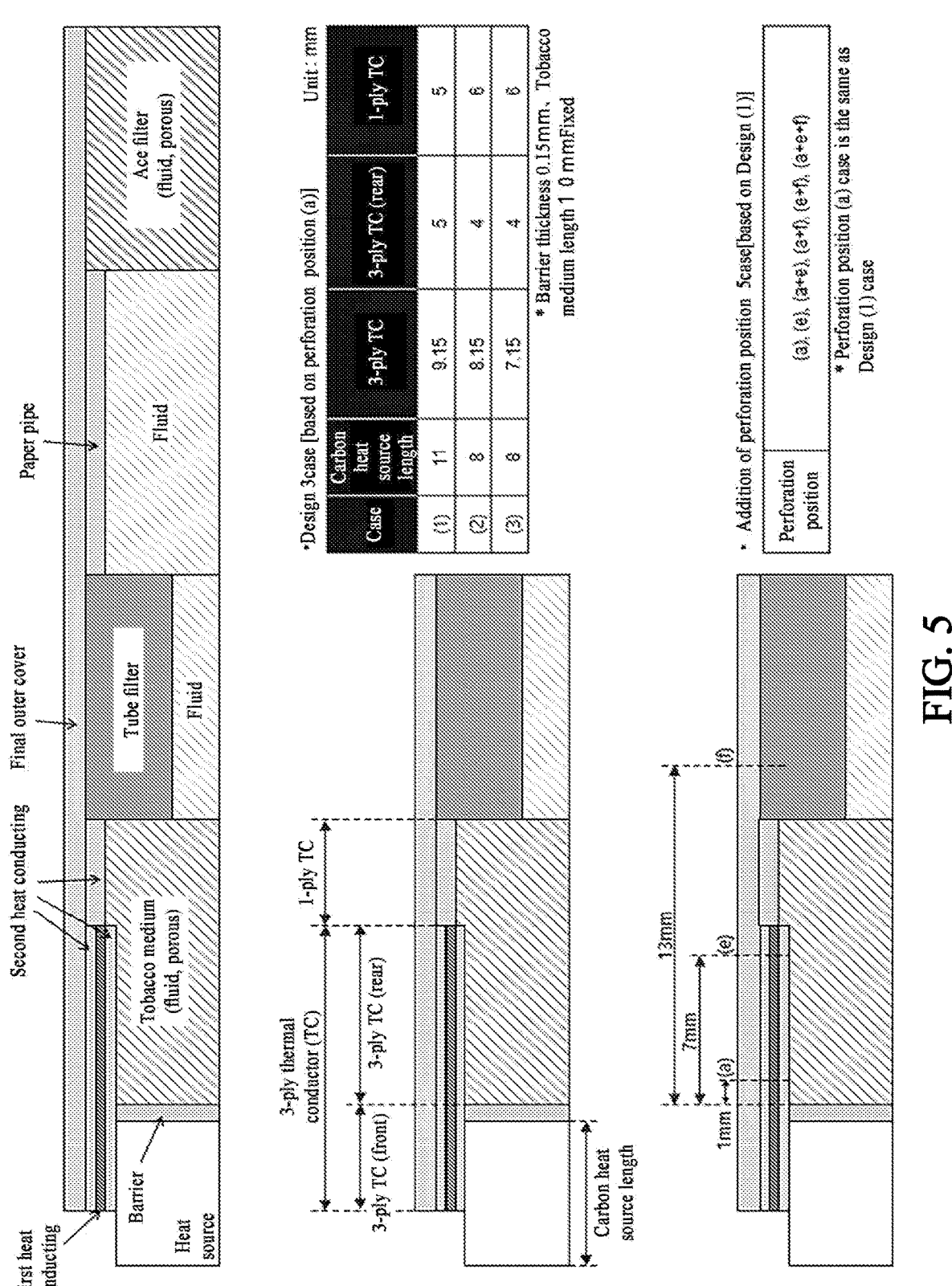
FIG. 5 is a diagram illustrating cigarette shapes and computational analysis conditions used in an optimization experiment of the embodiment of the present disclosure.

Perforations were rectangular (0.542 mm×0.188 mm), and there were a total of 8 perforations in one row along a circumferential direction. In the computational analysis, since only the ¼ area of the cigarette was considered, there were two perforations, and an outer atmospheric area surrounding the cigarette was 200 mm in radius and 300 mm in length. Cigarette components and computational analysis conditions were shown in FIG. 5.

2. Computational Grid, Computational Model, and Boundary Conditions

Figure 6:
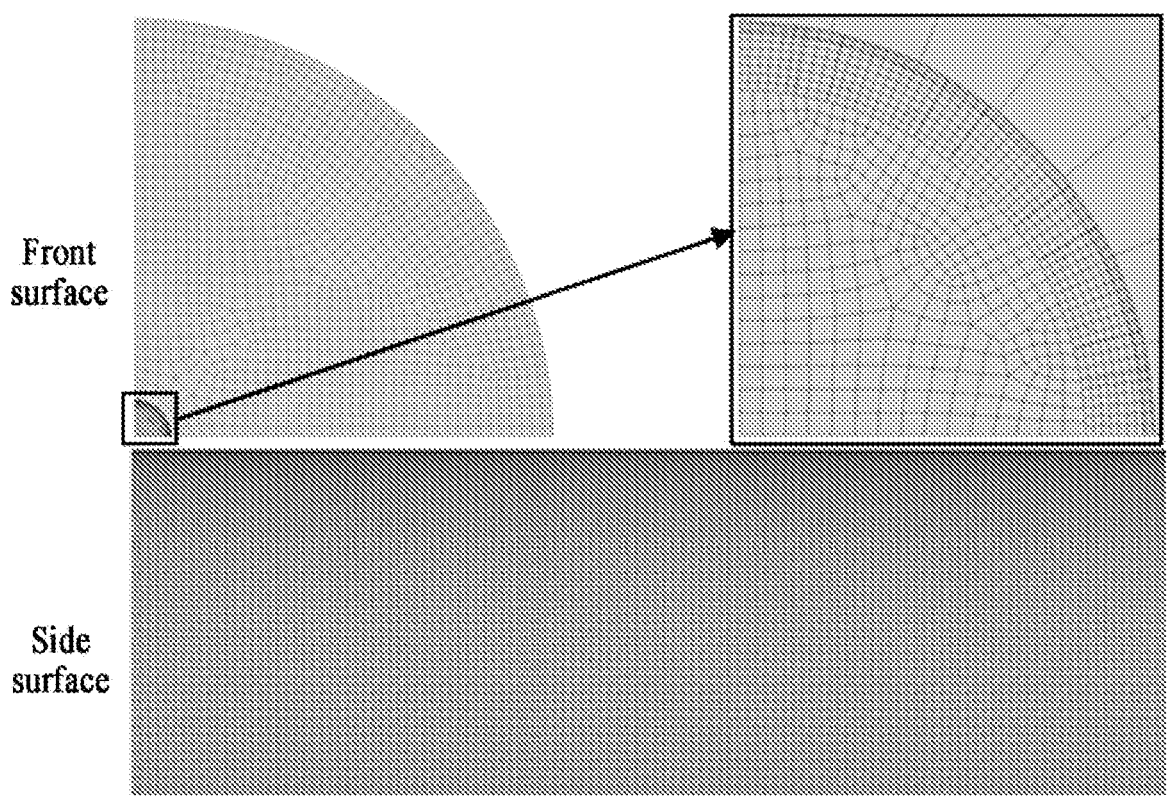
FIG. 6 is a diagram illustrating a grid used in the computational analysis.

The grid used in the computational analysis was shown in FIG. 6. Since a barrier, a heat conducting element, and paper had a significantly thin thickness, small-sized grids were used. In addition, larger-sized grids were used for relatively large-sized heat source and medium, and tetrahedral grids with good scalability were used for an external atmosphere and a filter portion which were less important, thereby reducing a computation time. Grids of different sizes were connected using a Fluent's interface function.

Transient computation was performed to determine a temperature change over time inside the cigarette. In order to simulate gas flow and heat transfer phenomena, the mass, momentum, and energy conservation equation were considered. Realizable k-e, a general-purpose turbulence model, was used to simulate the external atmosphere and the air flow introduced through the perforations. In the computational analysis, the chemical species conservation equation was excluded to shorten the computation time, but a nicotine response rate model was added as a UDF code to the tobacco medium portion to predict the amount of nicotine produced in the tobacco medium. The governing equations and calculation models used in the computational analysis were shown in Table 1 below.

The physical properties of each element used in the computational analysis were shown in Table 2. When inhaling, air was introduced through the perforation and then passed through tobacco medium-tube filter-paper pipe-ace filter. Among them, the tobacco medium and the ace filter may be expressed as a porous medium, and at this time, the resistance applied to the fluid is expressed by the following equation.

$$S = -\left(\frac{\mu}{\alpha}v + C_2\frac{1}{2}\rho v^2\right)$$

Here, an inertial resistance $C_2$ was neglected and permeability $\alpha$ was determined. Therefore, the magnitude of the flow resistance was proportional to the velocity of the fluid. At this time, the porosity of the tobacco medium was set to 0.62 and the permeability was set to $5.70\times10^{-10}$ $m^2$, and these values were obtained from reference literature. The middle of the barrier and the triply laminated paper were aluminum, and the physical properties referred to A1050. In addition, the paper, which was the material of the final outer cover, the outer side of the triply laminated paper, and the paper pipe, was based on the basis weight of 60 $g/m^2$, and each density was determined by dividing the thickness of the element by the basis weight. In addition, the materials of the tube filter and the ace filter were assumed as PLA. The permeability of the ace filter was set to $2.50\times10^{-10}$ $m^2$ obtained from the reference literature, and the porosity was assumed as 0.62, the same as that of tobacco leaves.

TABLE 1

| Equations |
| --- |
| Continuity |
| $$\frac{\partial \rho}{\partial t} + \nabla \cdot (\rho \vec{v}) = S_m$$ |
| Momentum |
| $$\frac{\partial}{\partial t}(\rho \vec{v}) + \nabla \cdot (\rho \vec{v} \vec{v}) = -\nabla p + \nabla \cdot \overline{\overline{\tau}} + \rho \vec{g} + S_{mom}$$ |
| Turbulence (Realizable k-ε) |
| $$\frac{\partial}{\partial t}(\rho k) + \frac{\partial}{\partial x_j}(\rho k u_j) = \frac{\partial}{\partial x_j}\left[\left(\mu + \frac{\mu_t}{\sigma_k}\right)\frac{\partial k}{\partial x_j}\right] + G_k + G_b - \rho\varepsilon - Y_M + S_k$$ |
| $$\frac{\partial}{\partial t}(\rho\varepsilon) + \frac{\partial}{\partial x_j}(\rho\varepsilon u_j) = \frac{\partial}{\partial x_j}\left[\left(\mu + \frac{\mu_t}{\sigma_\varepsilon}\right)\frac{\partial\varepsilon}{\partial x_j}\right] + \rho C_1 S\varepsilon - \rho C_2\frac{\varepsilon^2}{k + \sqrt{v\varepsilon}} + C_{1\varepsilon}\frac{\varepsilon}{k}C_{3\varepsilon}G_b + S_\varepsilon$$ |
| Energy |
| $$\frac{\partial}{\partial t}(\rho E) + \nabla \cdot (\vec{v}(\rho E + p)) = \nabla \cdot (k_{eff}\nabla T + (\overline{\overline{\tau}}_{eff} \cdot \vec{v})) + S_h$$ |
| Nicotine pyrolysis |
| $$\frac{dV_i}{dt} = A_i\exp\left[-\frac{E_{0i}}{RT}\left(1 - \frac{\alpha_i}{T}\right)\right](V_i^* - V_i); \; \alpha_i = \frac{(\sigma_i/R)^2}{2(E_{0i}/R)}$$ |

TABLE 2

| Material | Element | | Density (kg/m³) | Specific heat (J/kg-K) | Thermal conductivity (W/mK) |
|---|---|---|---|---|---|
| Tobacco leaf | Tobacco medium | | 289 | 794 | 0.0817 |
| Aluminum | Barrier/triply laminated paper | | 2700 | 900 | 230 |
| Paper | Final outer cover | Basis weight 60 g/m² | 1000 (thickness 0.06 mm) | 1400 | 0.02 |
| | Triply laminated paper | | 2000 (thickness 0.03 mm) | | |
| | | | 3000 (thickness 0.02 mm) | | |
| | Paper pipe | | 324 (thickness 0.185 mm) | | |
| PLA | Tube filter | | 1252 | 1590 (55° C.) | 0.111 (48° C.) |
| | Ace filter | | | 1955 (100° C.) | 0.197 (109° C.) |
| | | | | 2060 (190° C.) | 0.195 (190° C.) |

For the carbon heat source in the cigarette, the experimental temperature distribution data of the heat source were input on contact surfaces between the heat source-barrier and the heat source-heat conducting element.

Figure 7:
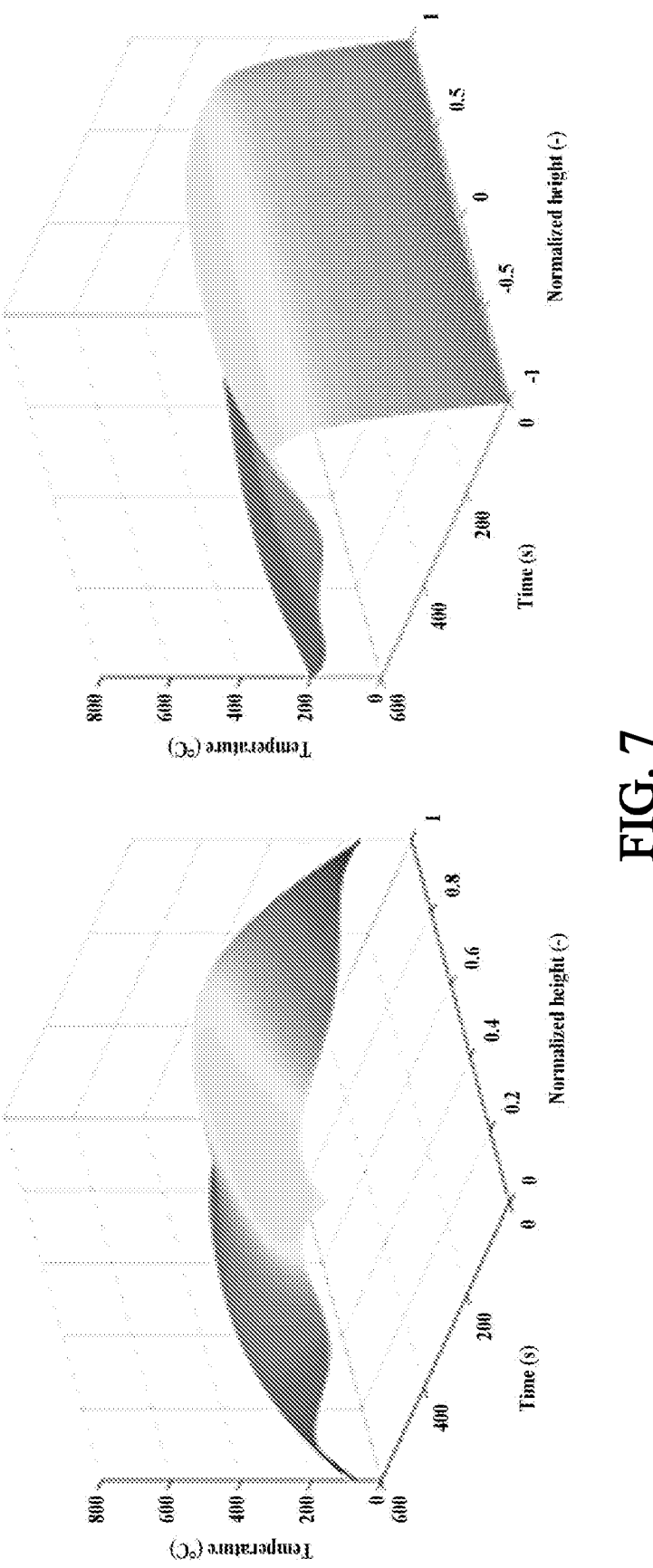
FIG. 7 is a diagram illustrating an experimental temperature distribution for a contact surface (left: heat source-barrier, right: heat source-heat conducting element).
Figure 8:
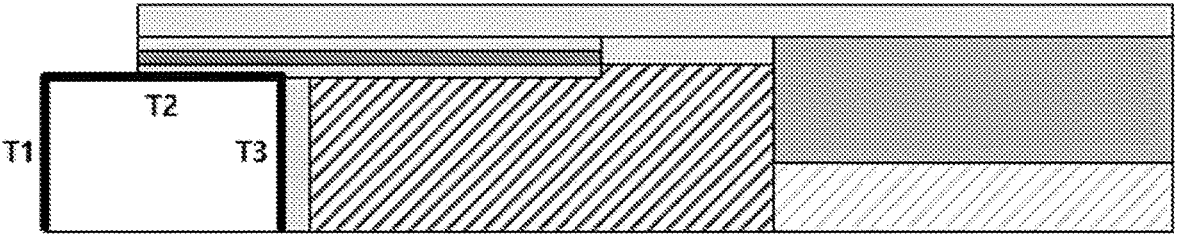
FIG. 8 is a diagram illustrating a surface input with an experimental temperature profile.

The temperature distribution input to the contact surfaces between the heat source-barrier and the heat source-heat conducting element was shown in FIG. 7, and the positions were shown in FIG. 8. A temperature $T_2$ of the contact surface between the heat source-barrier was a function of a time t and a height h of the heat source. A temperature $T_3$ of the contact surface between the heat source-heat conducting element was a function of t and a radius r. At this time, it was assumed that there was no temperature change in the circumferential direction. A temperature $T_1$ of the front surface of the heat source was assumed to be $T_2$ (h=0), and the temperature of this portion had little effect on heat transfer to the medium.

Since the smoking condition in the cigarette test was 55 ml for 2 seconds, and was set so that 6.875 ml of gas per second was discharged in the ¼ model of the computational analysis. An interval between smoking (Interpuff) was 30 seconds, and computational analysis was performed for a total of 12 puffs. In addition, the external atmosphere surrounding the cigarette was set to 1 atmospheric pressure and room temperature air.

The total computation time was set to 360 seconds and the time interval was set to 0.1 seconds, and 100 computations were performed for each time interval.

3. Computational Analysis Result 3.1. Reference Condition Analysis Result: Application of Perforation (a) in Design (1)

In order to calculate the nicotine production of the tobacco medium, the temperature distribution of the medium needs to be first predicted. The barrier and the heat conducting element surrounding the tobacco medium were main heat sources for heating the medium, and during inhalation, cooling and convective heat transfer phenomena by room temperature air flowing in from the perforation also occur in combination. Accordingly, in the computational analysis result, the temperature distribution and the heat transfer phenomenon inside the medium were identified over time, especially considering the puff.

Figure 9:
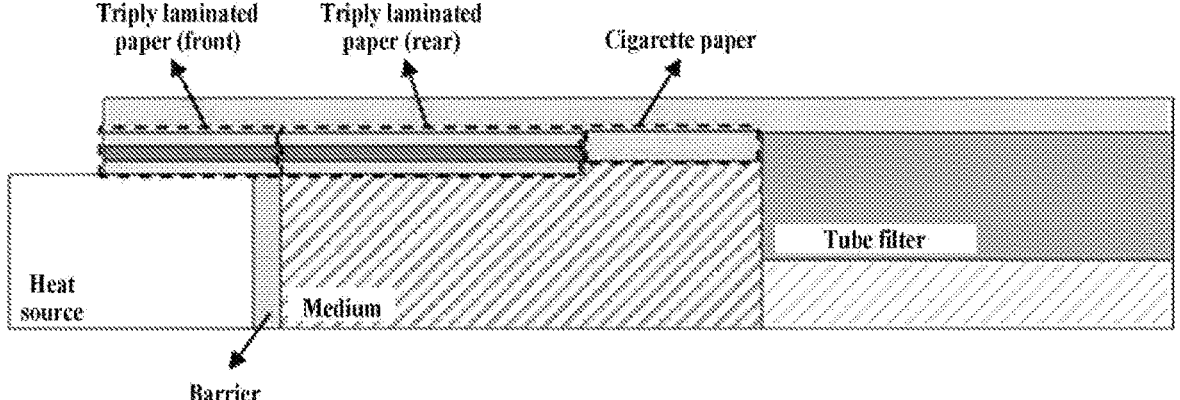
FIG. 9 is a diagram illustrating a heat conductor around a tobacco medium.

As illustrated in FIG. 9, elements related to the conducting heat of the medium included a barrier, triply laminated paper, and cigarette paper, and the tube filter at the back of the medium was also in contact with the medium, but was judged to have a small effect and was ignored in the analysis of the results. In addition, in the triply laminated paper, a portion in contact with the heat source was named the triply laminated paper (front), and a portion in contact with the medium was named the triply laminated paper (rear).

Figure 10:
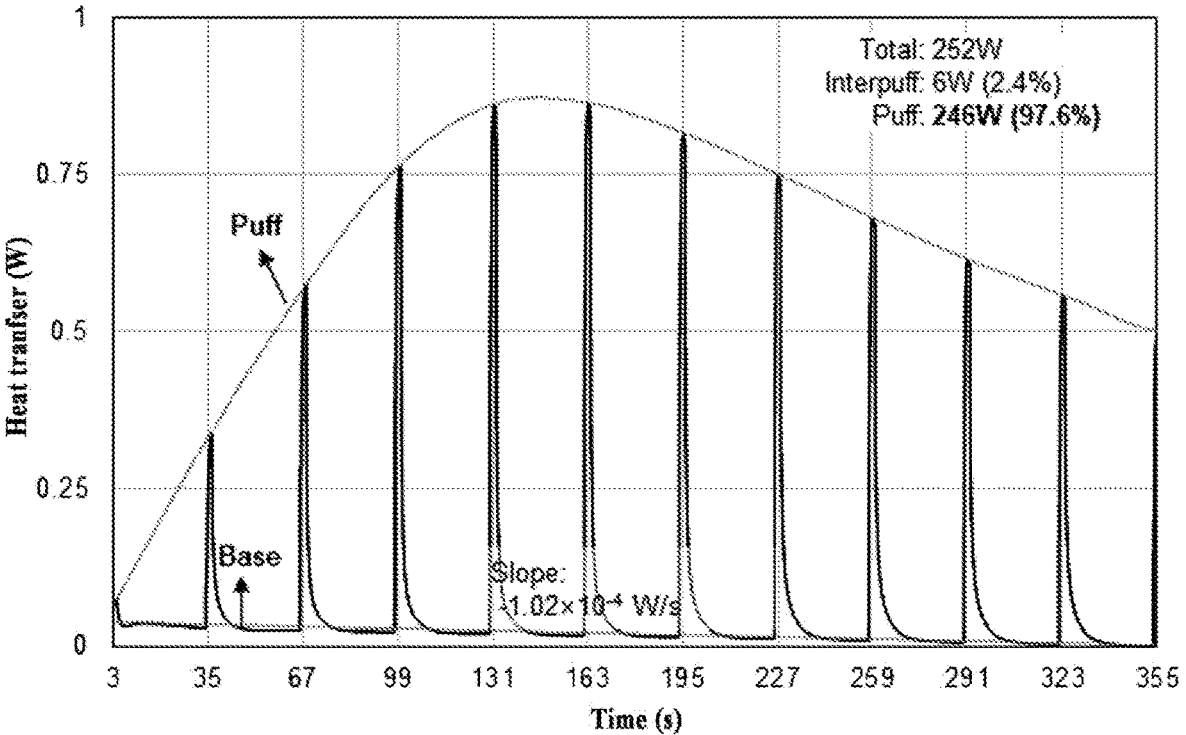
FIG. 10 is a diagram illustrating amounts of heat transfer to the tobacco medium over time.

FIG. 10 illustrated the amount of heat transferred to the tobacco medium over time. On a time as a horizontal axis, 3, 35, 67, 99, . . . , 355 seconds represent the time points of inhalation. In a graph, a blue line represented amounts of heat transfer, and a red dotted line represented an auxiliary line to distinguish an effect of Puff and Interpuff (between Puffs, normally). First, in the Interpuff, the amount of heat transfer was very low, and showed a gradual decrease over time. On the other hand, the amount of heat transfer in Puff had a form that rapidly increased instantaneously. When the peaks of the heat transfer amount during Puff were connected, the peaks increased and then decreased over time, which was similar to the temperature distribution of the medium. When calculated arithmetically, the tobacco medium absorbed 252 W of heat amount during the total computational analysis time of 362 seconds. Among them, since the slope was approximately $-1.02\times10^{-4}$ W/s, the heat transfer amount of Interpuff was 6 W by integrating the slope with respect to time. Accordingly, the amount of heat absorbed by the puff was 246 W, which was 97.6% of the total heat amount absorbed by the medium. Accordingly, it can be seen that the heat transfer of the medium was arithmetically governed by Puff.

Since the heat transfer amount of cigarette paper was always negative, the cigarette paper served to absorb heat, while the barrier and the triply laminated paper (rear) transferred and absorbed heat to the medium over time. In the early stage of smoking, the temperature of the portion in contact with the heat source and the triply laminated paper (front) was high and the barrier side was low. When ignited at the end of the heat source, the heat was gradually transferred to the barrier side, but the barrier side was little heated before reaching 35 s after the start of smoking. Accordingly, the heat generated from the heat source was transferred to the triply laminated paper (front)→triply laminated paper (rear)→tobacco medium, and some of the heat was discharged through the barrier and the cigarette paper. In the middle of smoking, the temperature of the portion in contact with the heat source and the triply laminated paper (front) was rather lower than the portion in contact with the barrier. Accordingly, the heat transfer direction was shown in the barrier→tobacco medium unlike the previous direction, and some of the heat was discharged through the triply laminated paper (rear) and the cigarette paper. In the latter of smoking, as the heat source was combusted, the highest temperature was shown at the portion in contact with the triply laminated paper (front). Accordingly, the heat transfer direction was similar to that at the beginning of smoking. Such a heat transfer mechanism was for Interpuff, and the Puff mechanism was relatively simple. Since the medium was cooled by the air introduced from the perforations, the medium temperature was much lower than that of the barrier and the triply laminated paper (rear). Accordingly, when puffing, the heat rapidly flowed into the barrier and the triply laminated paper (rear), and some of the heat was discharged to the cigarette paper.

Figure 11:
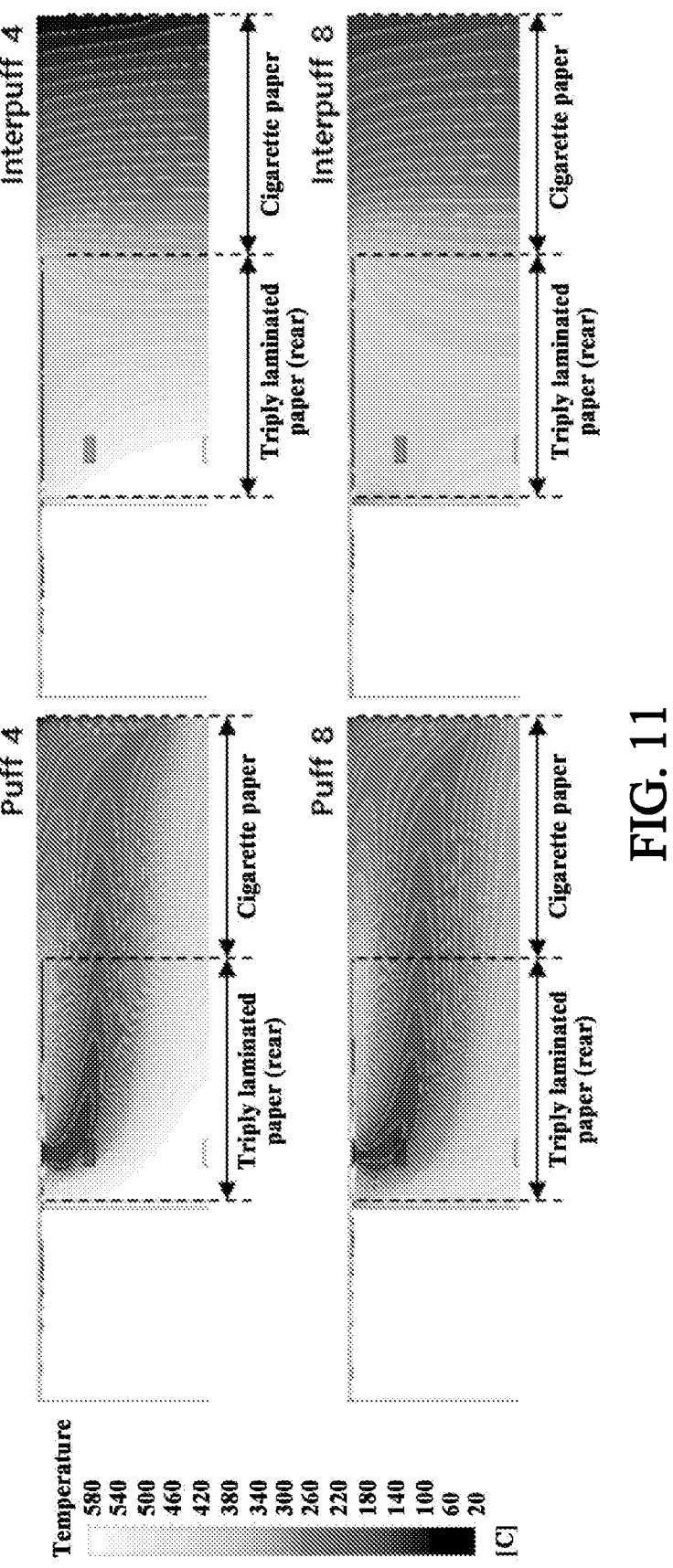
FIG. 11 is a diagram illustrating results of confirming a medium temperature distribution during Puff or Interpuff.

FIG. 11 illustrated the temperature distribution inside the medium during Puff or Interpuff. When puffing, air at room temperature was introduced through the perforation, which cooled a considerable area inside the medium. In particular, since the position of the perforation existed close to the barrier, the temperature of the region in contact with the barrier in the medium also rapidly decreased. In addition, during Puff, the heat in the front portion of the medium was diffused, and as a result, the temperature around or in the center of the cigarette paper was increased at the back of the medium. During Interpuff, the temperature distribution was high near the center on the side in contact with the barrier, and low at the back of the medium.

Figure 12:
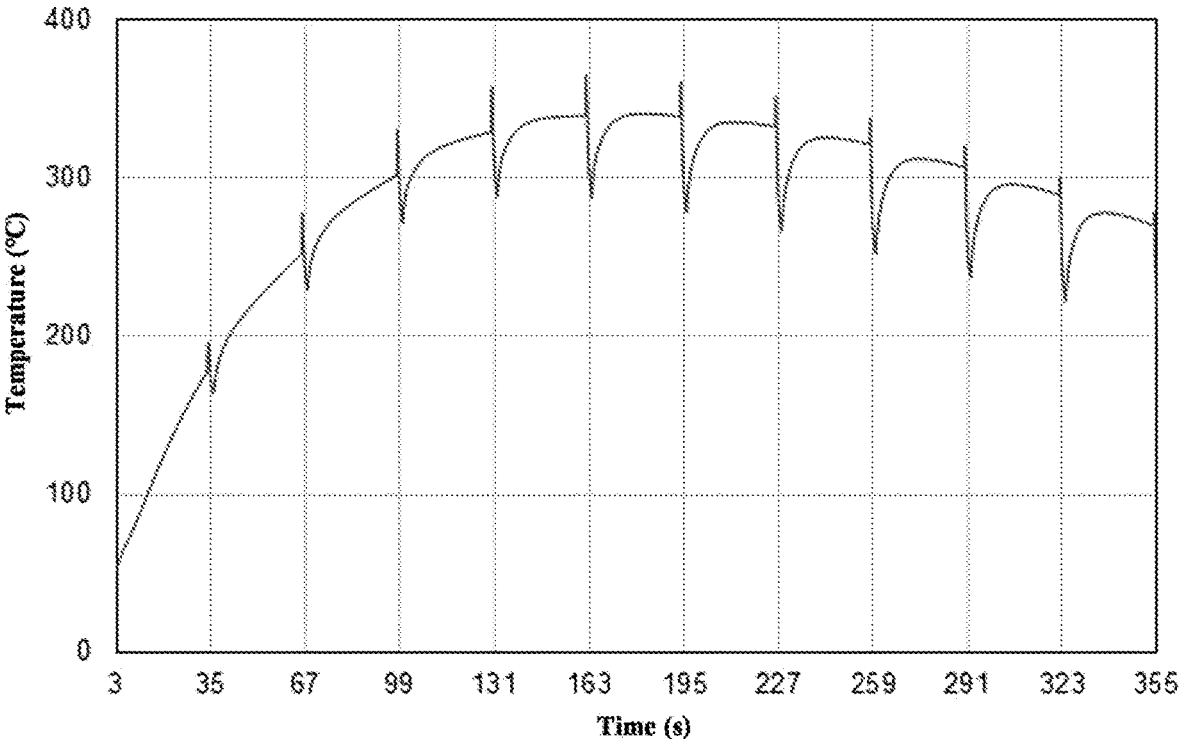
FIG. 12 is a diagram illustrating results of confirming changes in volume-averaged temperature of the tobacco medium over time.

FIG. 12 illustrated the temperature change of the tobacco medium over the total analysis time. As time passed, the average temperature increased, and then the temperature was highest in the middle of smoking, and thereafter, gradually decreased. In addition, for each inhalation time point, the temperature decreased very rapidly and then rapidly recovered. Since the barrier, which was a solid material constituting the cigarette, and respective heat conducting elements had a high specific heat, even if the temperature changed during Puff, the change was quickly recovered to the previous level.

Figure 13:
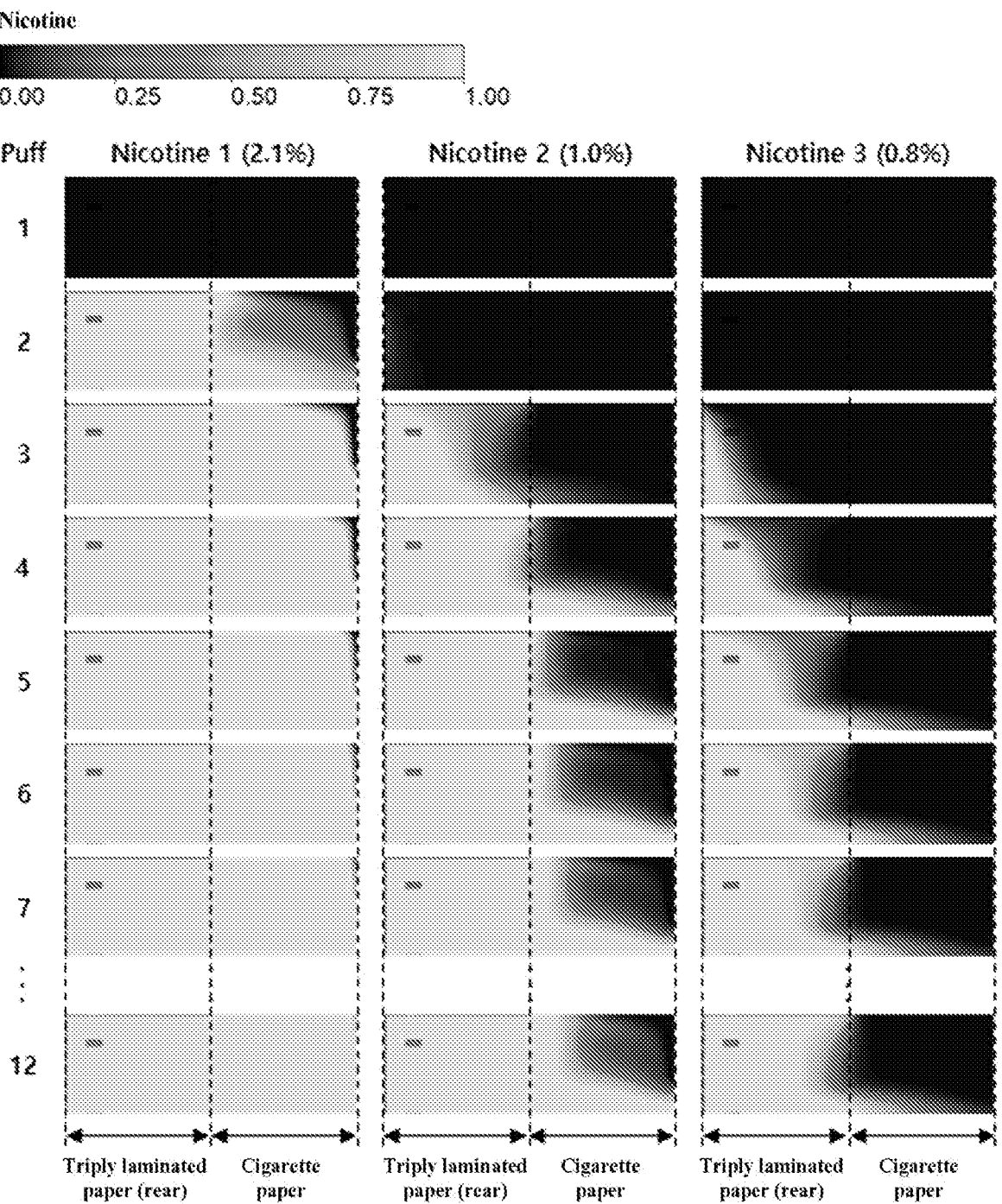
FIG. 13 is a diagram illustrating results of confirming amounts of nicotine generated in the tobacco medium (Nicotine 1, 2, and 3 represent nicotine peak numbers shown in FT-IR results).

FIG. 13 illustrated Puff numbers, that is, the amounts of nicotine produced over time. Red means that nicotine has been completely discharged from the medium, blue means that nicotine has not yet been discharged. In the drawing, numbers 1, 2, and 3 behind nicotine indicated peak numbers when nicotine was discharged in FT-IR measurement data for the tobacco medium. When the tobacco medium was heated, nicotine was not discharged at once, but showed a form of multi-peak, which was discharged over several temperature ranges. The kinetic parameters of each peak were shown in Table 3. As time passed, nicotine appeared to be consumed from the front, and Nicotine 1 was mostly discharged at a relatively early point. Nicotine 2 and Nicotine 3 still remained even in Puff 12 (355 seconds), and Nicotine 3 had particularly high activation energy. Accordingly, nicotine may be efficiently generated only when heat is transferred to the rear portion of the tobacco medium, especially near the cigarette paper.

TABLE 3

| Peak | A (s⁻¹) | E0/R (K) | V* (wt. % daf) |
|------|---------|----------|----------------|
| 1 | $7.2 \times 10^{15}$ | $1.960 \times 10^4$ | 2.1 (53.8%) |
| 2 | $2.2 \times 10^{11}$ | $1.826 \times 10^4$ | 1.0 (25.6%) |
| 3 | $2.8 \times 10^{13}$ | $2.463 \times 10^4$ | 0.8 (20.5%) |

Figure 14:
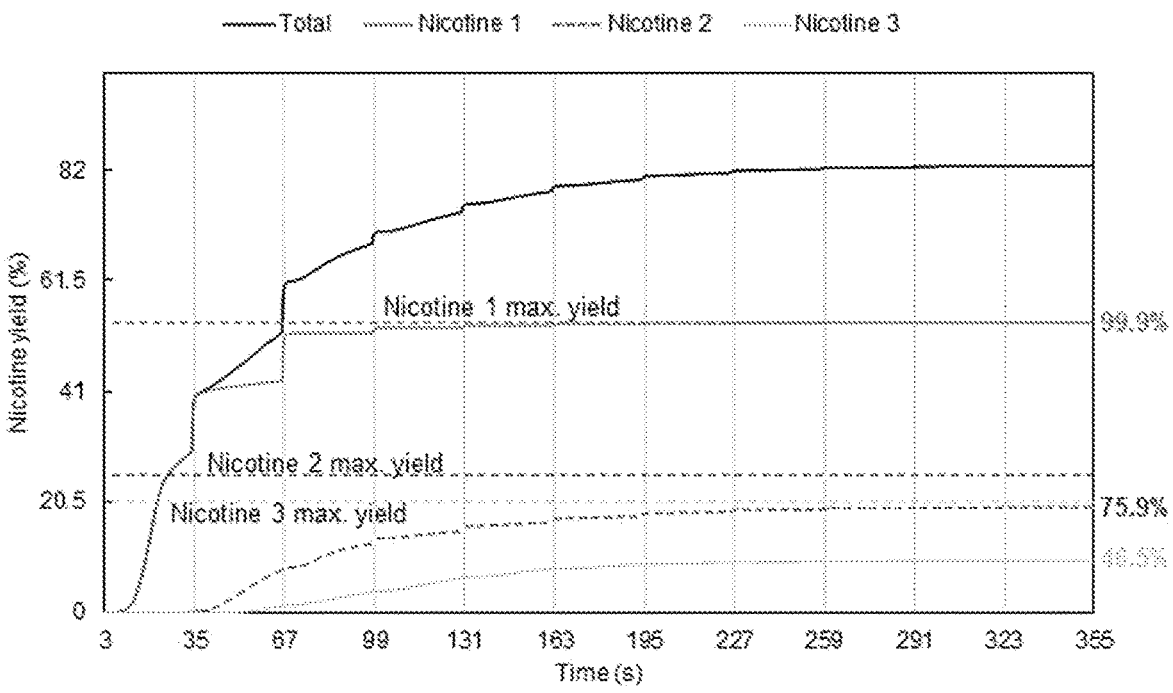
FIG. 14 is a diagram illustrating results of confirming amounts of nicotine yield over time.

FIG. 14 illustrated Nicotine 1 to 3 and the total amounts of nicotine yield over time. In the early stage of smoking (3 to 35 seconds), the yield amount of Nicotine 1 gradually increased even if inhalation did not occur. This is because Nicotine 1 was easily discharged even at a low temperature when the front of the tobacco medium was gradually heated. However, after Puff 2 (35 seconds), the generation amount of Nicotine 1 rapidly increased only at the moment of Puff, and did not occur usually. This is because the back of the tobacco medium is not usually consumed, and nicotine is generated by the heat that diffuses at the moment of Puff. Accordingly, it can be seen that Puff, that is, heat diffusion plays an important role even in Nicotine 1, which has low activation energy. In addition, Nicotine 2 and 3 started to be discharged late due to high activation energy and gradually increased. Although Nicotine 2 and 3 increased stepwise according to Puff, the width was very small. Accordingly, when puffing, higher temperature heat needs to be transferred to consume both Nicotine 2 and 3. Each nicotine was discharged at 99.9%, 75.9%, and 46.5% of the total amount, respectively.

3.2. Analysis Result According to Design

Figure 15:
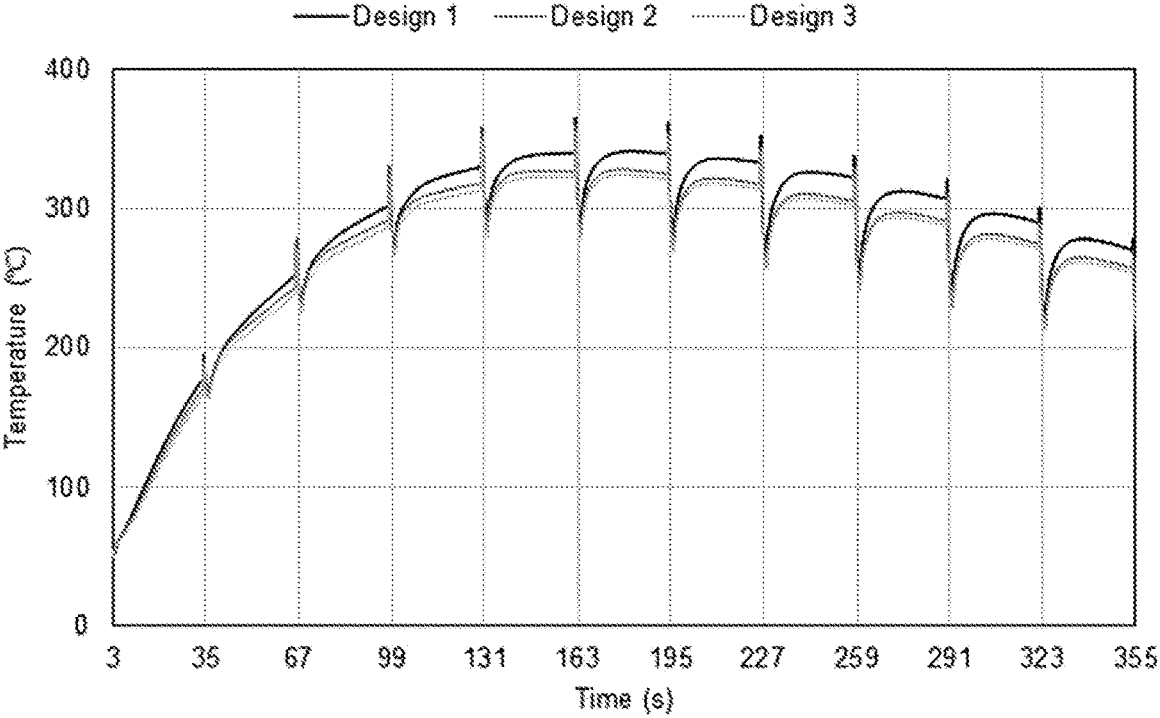
FIG. 15 is a diagram illustrating results of confirming medium temperature (volume-averaged) changes over time for each design.

FIG. 15 illustrated a medium temperature change over time for each design. The average volume of the medium was used as the temperature. For all times, the medium temperature was the highest in Design 1. In addition, Design 2 had a higher temperature than Design 3, but a difference thereof was not large.

Figure 16:
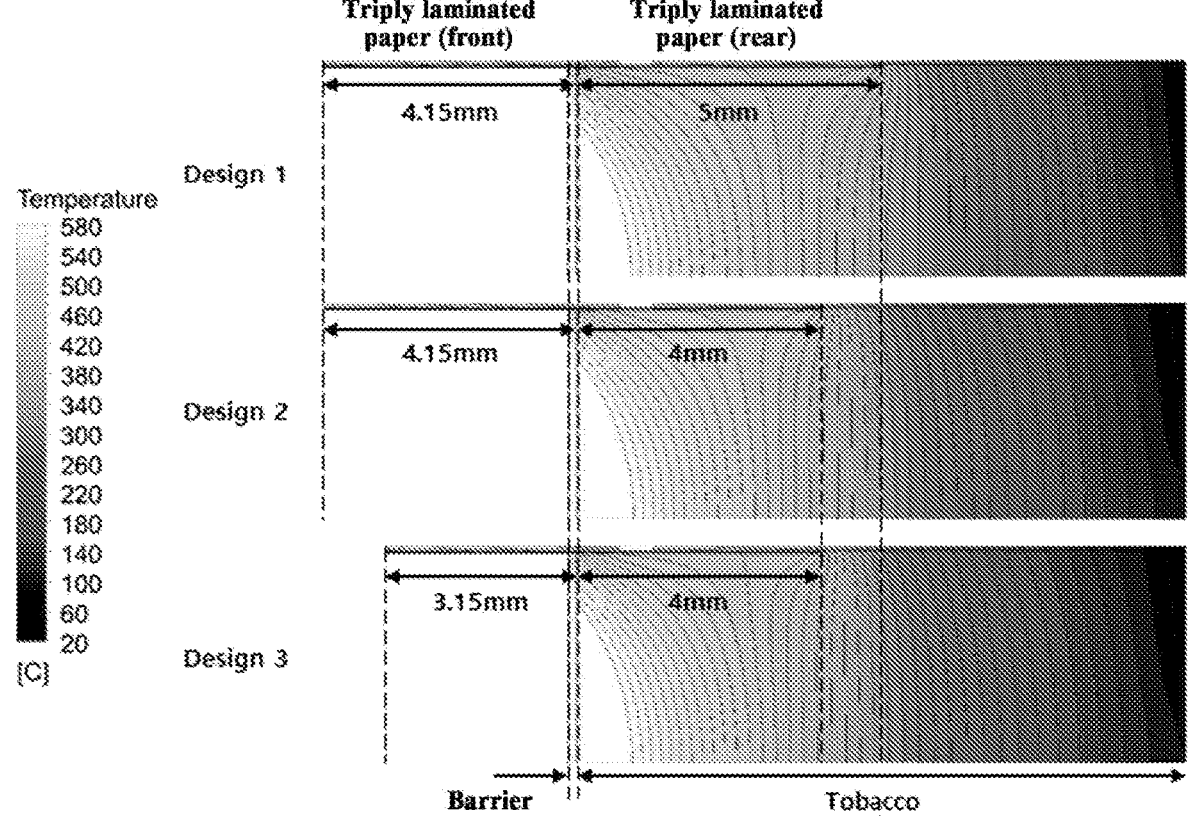
FIG. 16 is a diagram illustrating results of confirming a heat conducting element and a tobacco medium temperature distribution (Interpuff 4) for each design.
Figure 17:
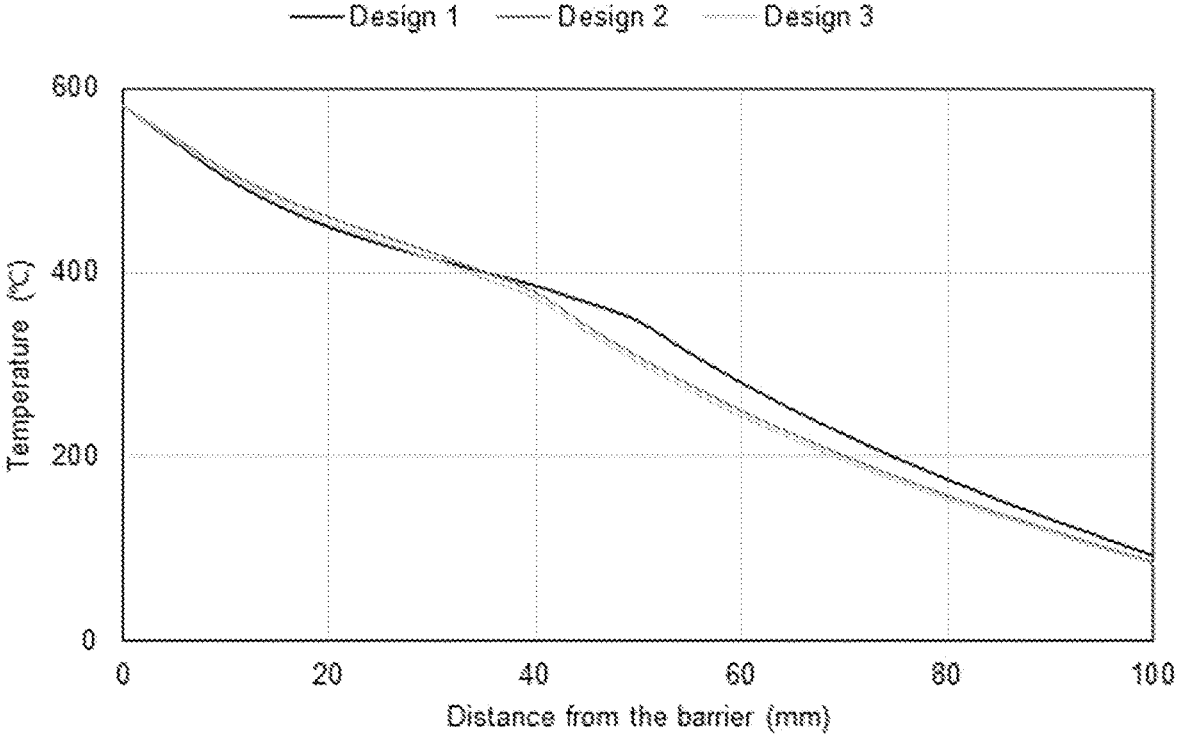
FIG. 17 is a diagram illustrating results of confirming a tobacco medium temperature distribution.

FIG. 16 illustrated a temperature distribution inside the tobacco medium for each design. For all time zones, since the temperature trend was the same regardless of Puff and Interpuff, the results were typically shown in the middle of smoking (Interpuff 4). Design 1 had a triply laminated paper (rear) length longer than Designs 2 and 3. Accordingly, it can be seen that the high temperature region was more widely distributed inside the tobacco medium. In addition, in Designs 2 and 3, a small amount of heat to be absorbed was increased because the cigarette paper was longer. FIG. 17 showed a graph of a temperature distribution of the tobacco medium. In Design 1, the length of the triply laminated paper (rear) was longer than that of other Designs. Accordingly, at the front of the medium, since the heat from the heat source spread over a wider range, the temperature was decreased, but the effect was small. In addition, since the heat may be transferred to the rear portion of the medium farther than in other Designs, the medium temperature increased. Compared to Designs 2 and 3, generally, Design 2 had a higher temperature, but since the length of the triply laminated paper (front) was longer, the heat was further absorbed from the heat source. However, the difference was very small.

Figure 18:
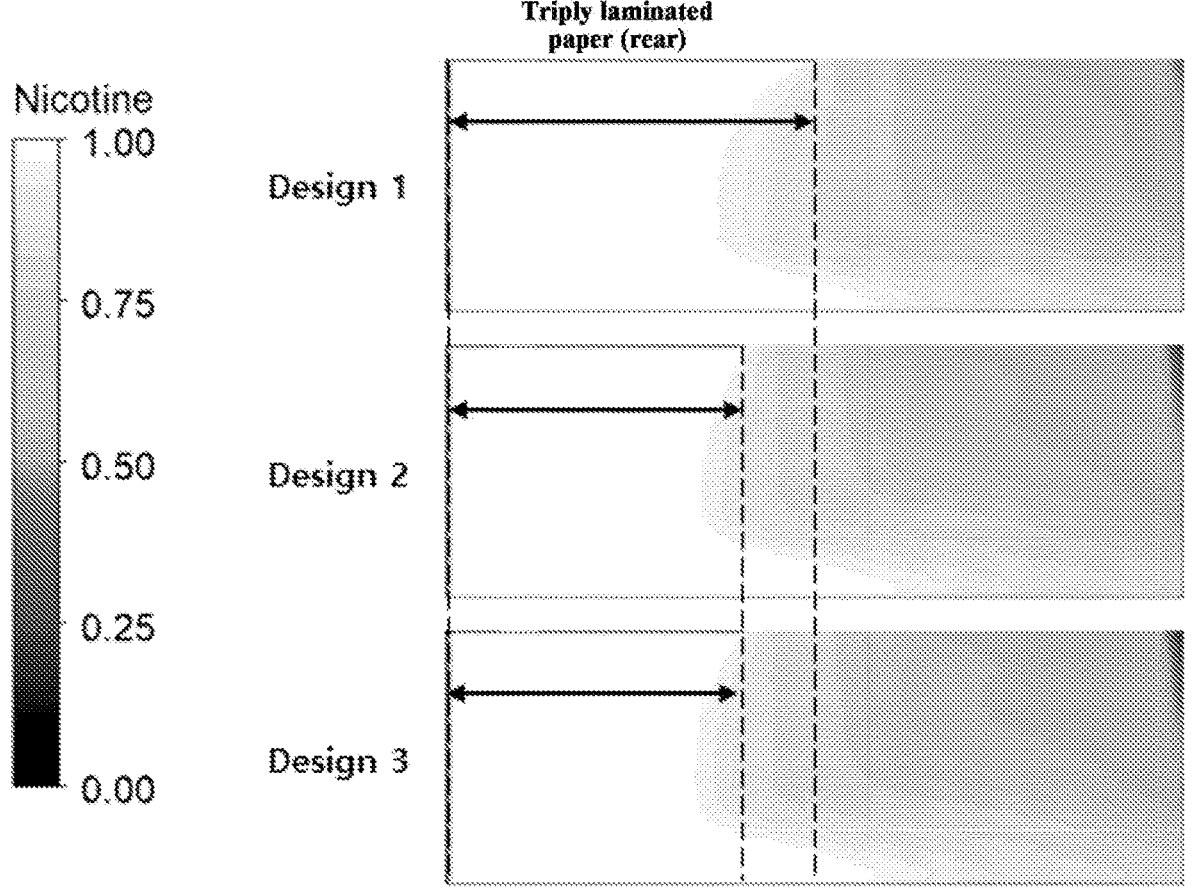
FIG. 18 is a diagram illustrating results of confirming a nicotine generation distribution for each design.
Figure 19:
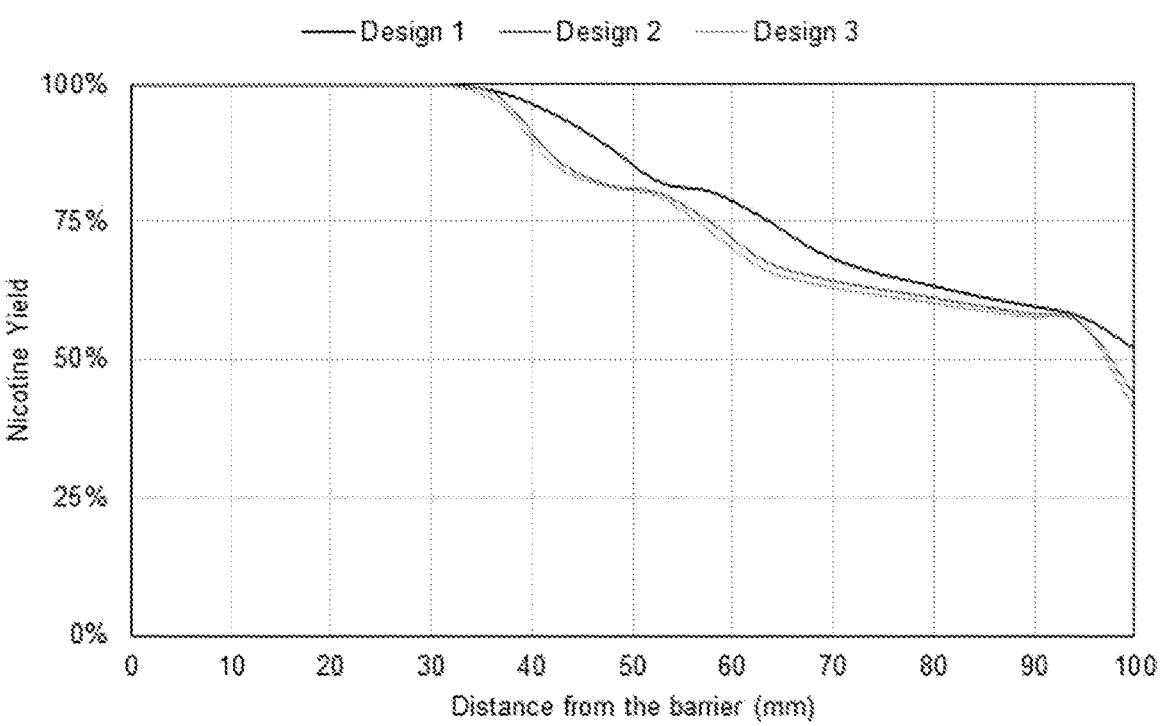
FIG. 19 is a diagram illustrating results of confirming nicotine generation amounts according to a medium distance for each design.

FIG. 18 illustrated a distribution of nicotine generation amounts for each design. The appearance of nicotine generation was generally similar, and the range of nicotine generation also decreased as the length of the triply laminated paper (rear) was shortened. In addition, at the rear portion of the medium, the nicotine generation amount was still low. FIG. 19 illustrated nicotine generation amounts according to a medium distance for each design. Similarly to the temperature distribution of the medium, Design 1 showed a shift to the right compared to Designs 2 and 3. In view of this trend, since the medium may be heated to the rear portion of the medium when the length of the triply laminated paper (rear) may be increased, it is determined that Nicotines 2 and 3 may be increased. However, the temperature of the front portion of the medium may decrease slightly, but since this area is easily heated and all nicotine is generated in the early stage of smoking, it is assumed that there is no problem with the total amount of nicotine yield.

Figure 20:
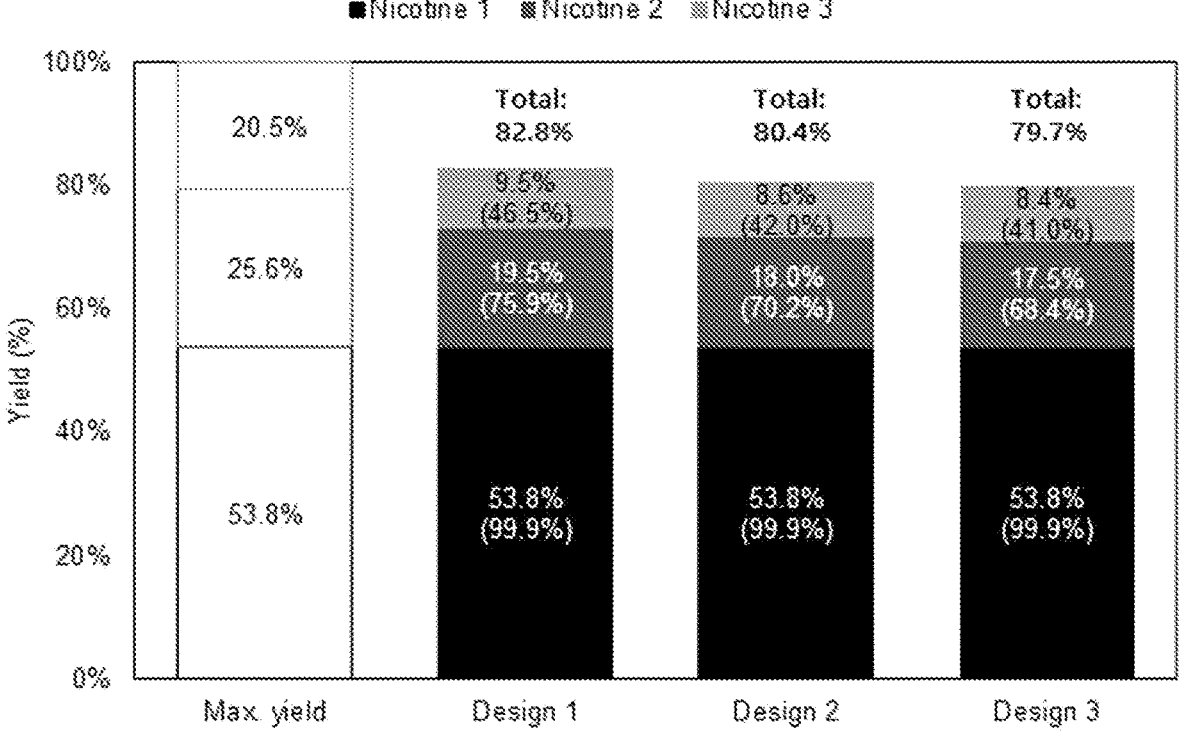
FIG. 20 is a diagram illustrating results of confirming a total amount of nicotine yield for each design (nicotine numbers represent peak numbers from a TG-FTIR experiment).

FIG. 20 illustrated a total amount of nicotine yield for each design. Max. Yield at the left side represented the amount of nicotine generable in the tobacco medium. Since Designs 2 and 3 had a shorter length of the triply laminated paper (rear) than Design 1, the temperature at the rear portion of the medium was lower, and thus the amount of nicotine generation was reduced by 2.4 to 3.1% p. When describing the configuration, it can be seen that there was no difference in Nicotine 1 at 99.9%, but Nicotines 2 and 3 decreased. In Design 3, the overall temperature of the medium was slightly lower than that in Design 2 because the length of the triply laminated paper (front) was shorter. As a result, nicotine was slightly lower than that of Design 2, but the difference was not large. Accordingly, as a result of the computational analysis of the designs, Design 1 can be seen as the optimal condition in terms of nicotine generation.

3.3. Analysis Result According to Perforation Position

Figure 21:
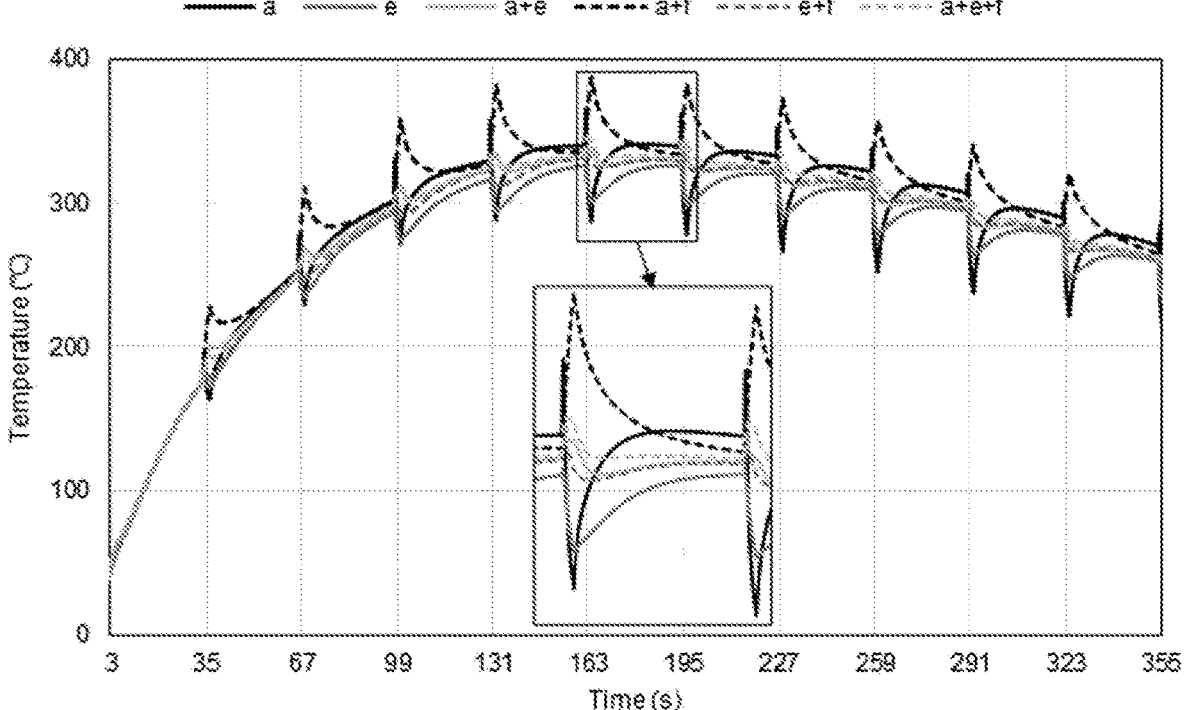
FIG. 21 is a diagram illustrating results of confirming medium temperature (volume-averaged) changes over time for each perforation position condition.

In the computational analysis according to a perforation position, an effect on medium temperature and nicotine yield under three conditions (a), (e), and (a+e) and when (f) was added hereto was identified. FIG. 21 illustrated a medium temperature change over time for each perforation position. As a temperature pattern was changed according to a change in design, it was difficult to derive a correlation, so that a function of each perforation was determined through the temperature distribution inside the medium.

Figure 22:
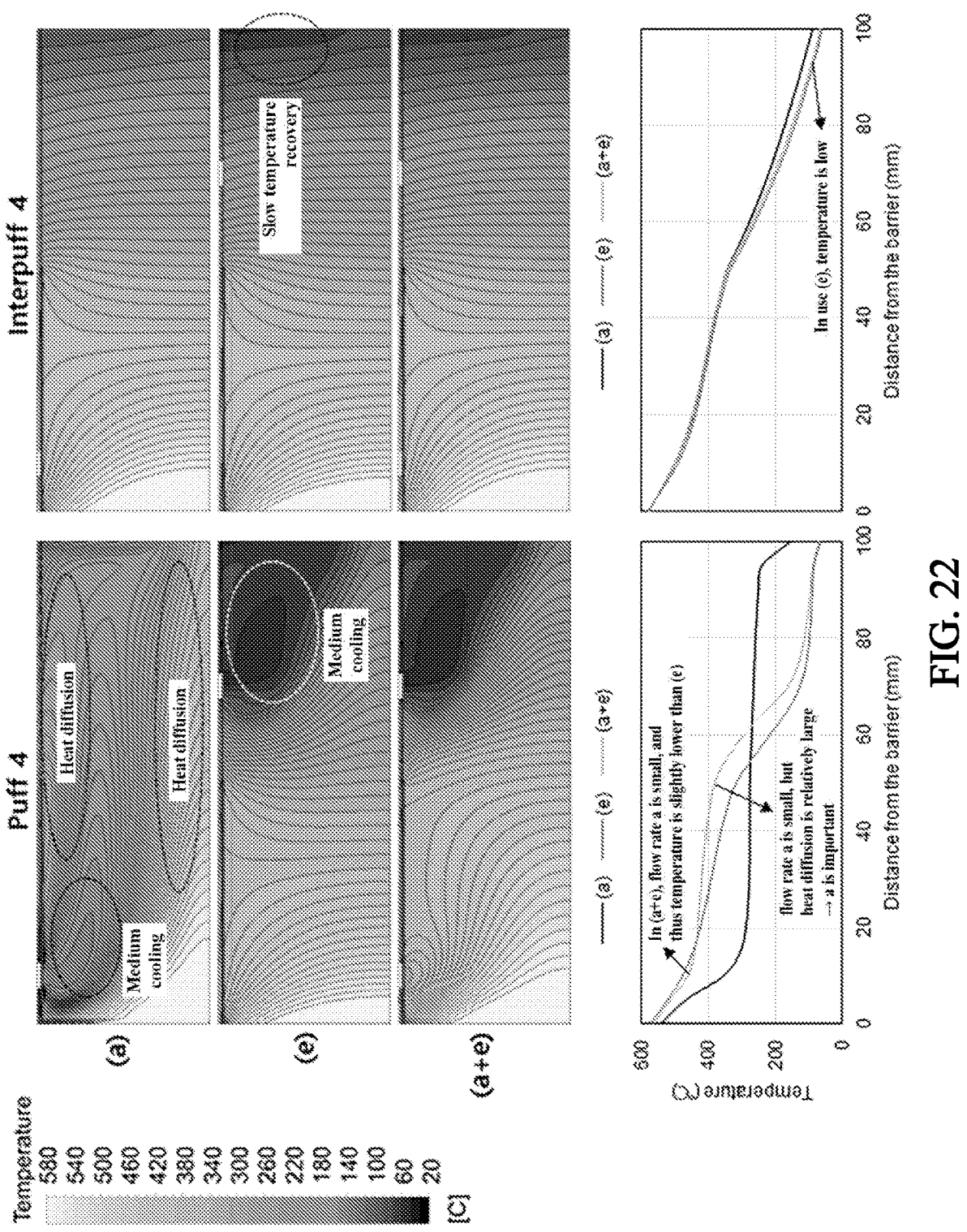
FIG. 22 is a diagram illustrating results of confirming a temperature distribution of the tobacco medium for each perforation position condition.
Figure 23:
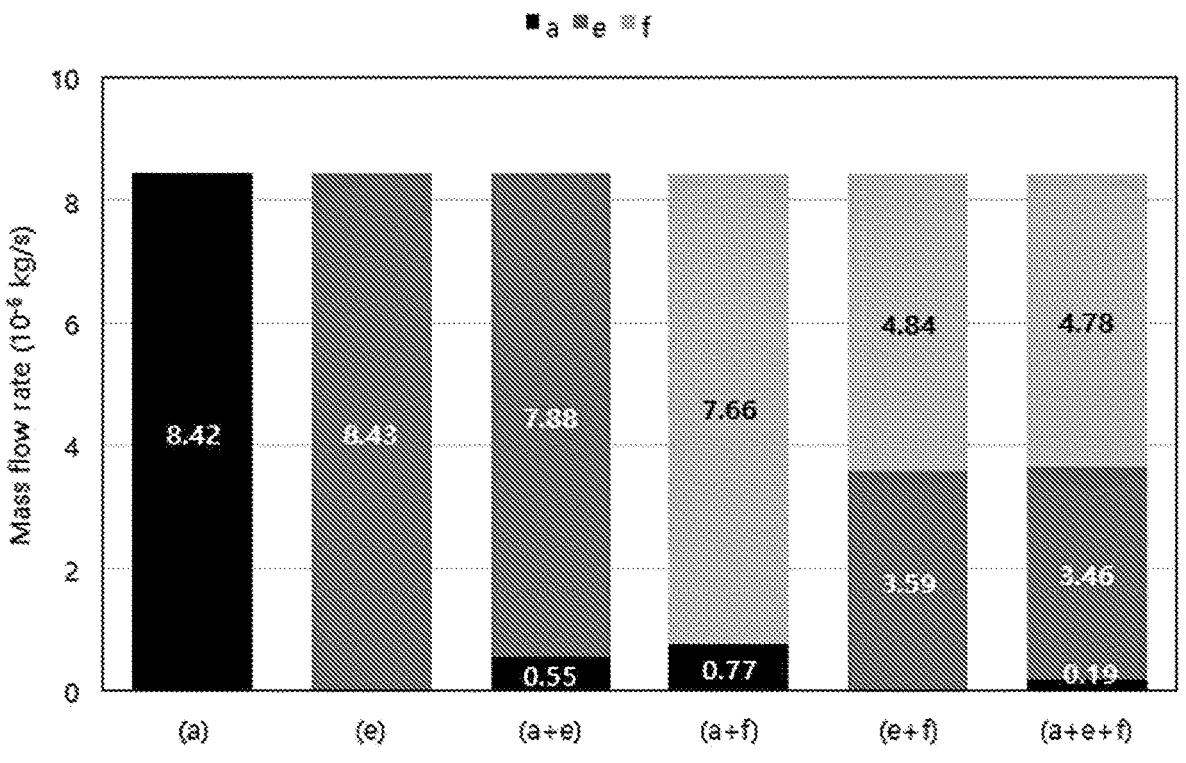
FIG. 23 is a diagram illustrating results of confirming an air inflow rate of each perforation for each analysis condition.

FIG. 22 illustrated a temperature distribution of the tobacco medium for each perforation position. As shown in the previous results, a perforation (a) served to cool the front portion of the medium while spreading the heat to the rear side. A perforation (e) cooled the rear portion of the medium, but had no heat diffusion effect. (a+e) showed both the effects of (a) and (e), but was closer to (e). FIG. 23 illustrated the flow rate of air introduced from each perforation according to an analysis condition. For example, in an (a+e) condition, the perforations (a) and (e) had the same area, but the flow rate was not divided by half. Since the tobacco medium was a flow-resistant material, it was difficult to suck in air as far away from a tobacco inlet (ace filter). Accordingly, the flow rate of air introduced into each perforation in a condition (a+e+f) was shown in the order of (f), (e), and (a). In particular, when the perforation (a) was used together with other perforations, the flow rate introduced into the perforation (a) was extremely small. Accordingly, in terms of the temperature distribution of the medium, it can be seen that (a+e) was similar to (e), and (a+e+f) and (e+f) were similar to each other.

Figure 24:
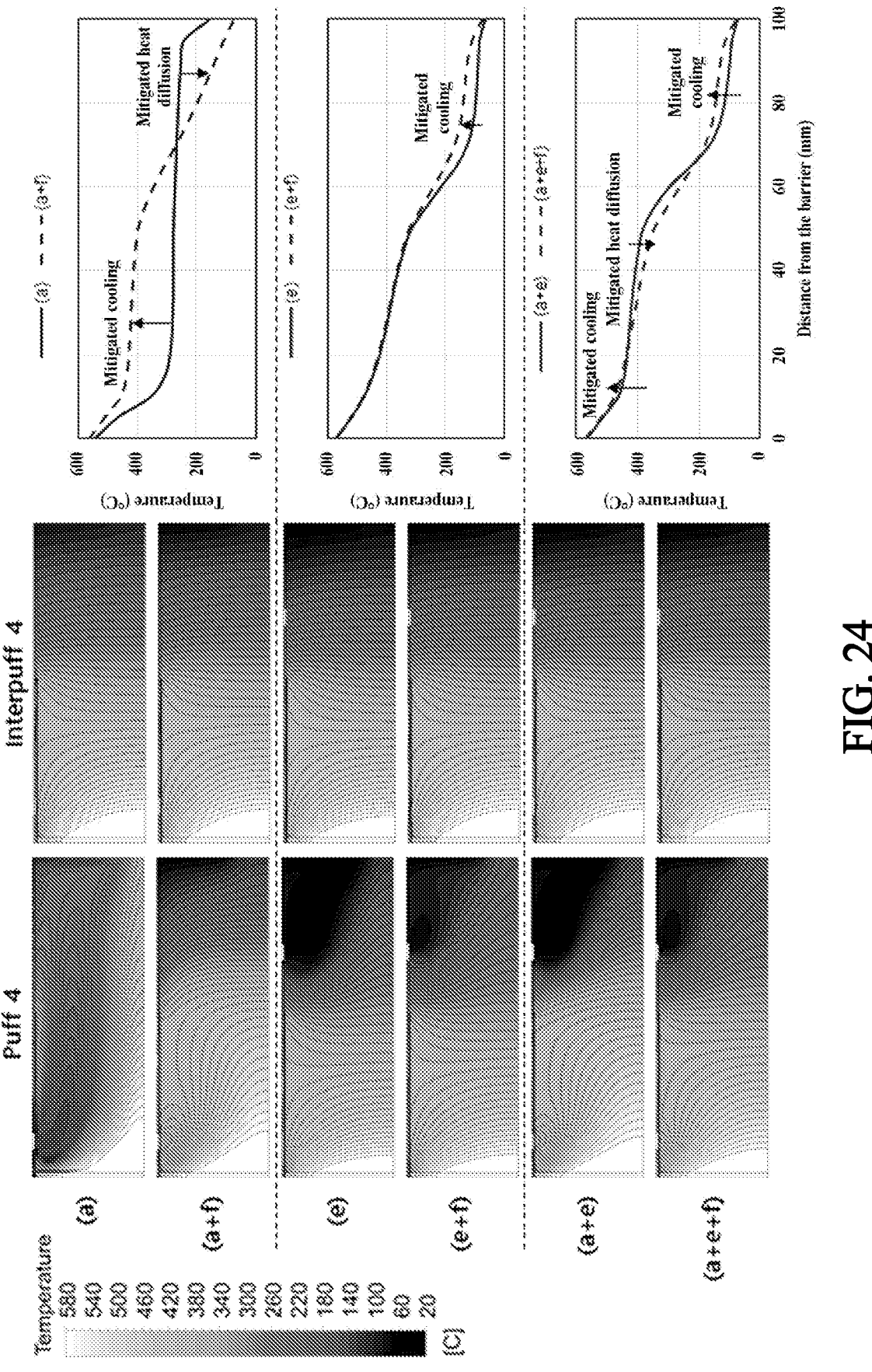
FIG. 24 is a diagram illustrating results of confirming medium temperature changes when using a perforation (f).

FIG. 24 illustrated a medium temperature change when a perforation (f) was used together with other perforations. The perforation (f) was not directly affected because its position was not the tobacco medium, but the tube filter. However, when the perforation (f) was used in combination with the perforation (a) or (e), the air inflow was reduced. Accordingly, there was an effect of alleviating the function of each perforation. When the perforation (f) was used with (a), the temperature of the front portion of the medium increased and the temperature of the rear portion decreased. This was to mitigate the cooling and heat diffusion effects of (a). When used with the perforation (e), the cooling effect at the rear portion of the medium was mitigated, and when used with (a+e), the effects of both (a) and (e) were mitigated.

Figure 25:
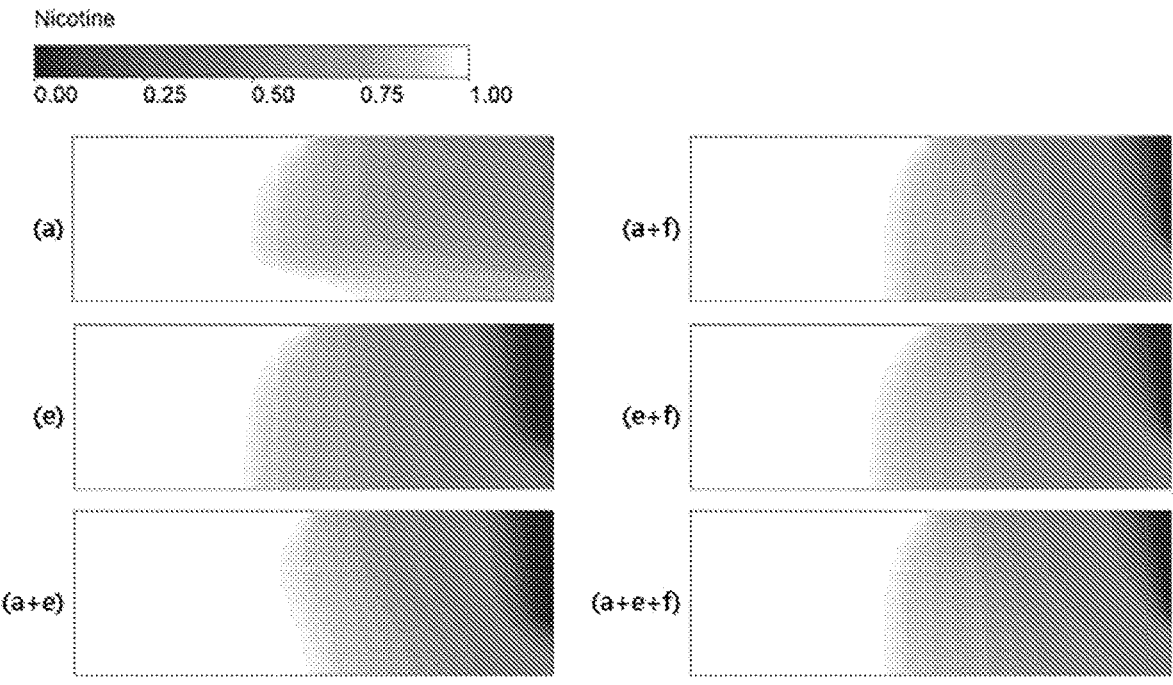
FIG. 25 is a diagram illustrating results of confirming a nicotine generation distribution for each perforation position condition.

FIG. 25 illustrated a distribution of nicotine generation amounts for each perforation position condition. Except for the condition (a), it can be confirmed that the amount of nicotine generated at the rear portion of the medium was greatly reduced in all cases. Accordingly, in terms of nicotine, the perforation (a) is the most important, and when used together with other perforations, the flow rate of the perforation (a) decreases, so that nicotine generation at the rear portion of the medium is reduced.

Figure 26:
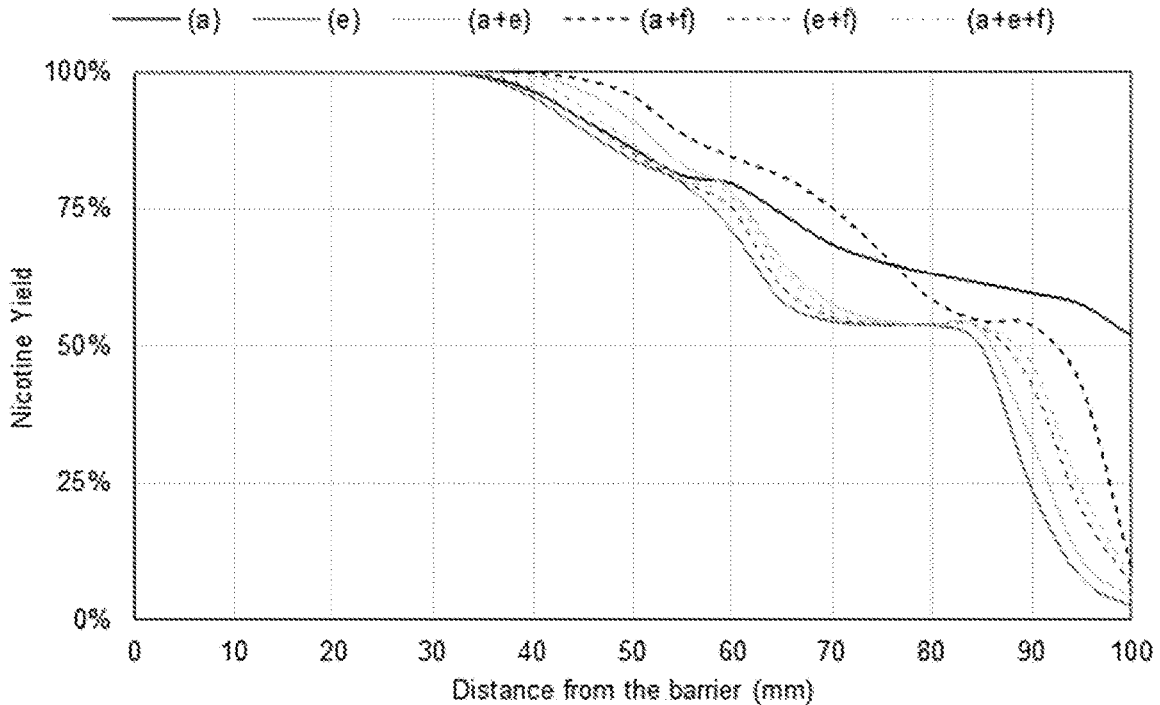
FIG. 26 is a diagram illustrating results of confirming nicotine generation amounts according to a medium distance for each perforation position condition.

FIG. 26 illustrated nicotine generation amounts according to a medium distance. In all conditions, nicotine was completely generated up to 30 mm from the front of the medium, and thereafter, the generation amount gradually decreased as the distance increased. When using the perforation (e), nicotine generation was greatly reduced after 60 mm. Among the conditions, in the case of (a+f), the amount of nicotine generation was increased from 40 to 75 mm compared to (a), which was because the flow rate flowing into (a) was small and heat was diffused to the middle of the medium. However, like other conditions, the amount of nicotine generation at the rear portion of the medium was lower than that of the condition (a).

Figure 27:
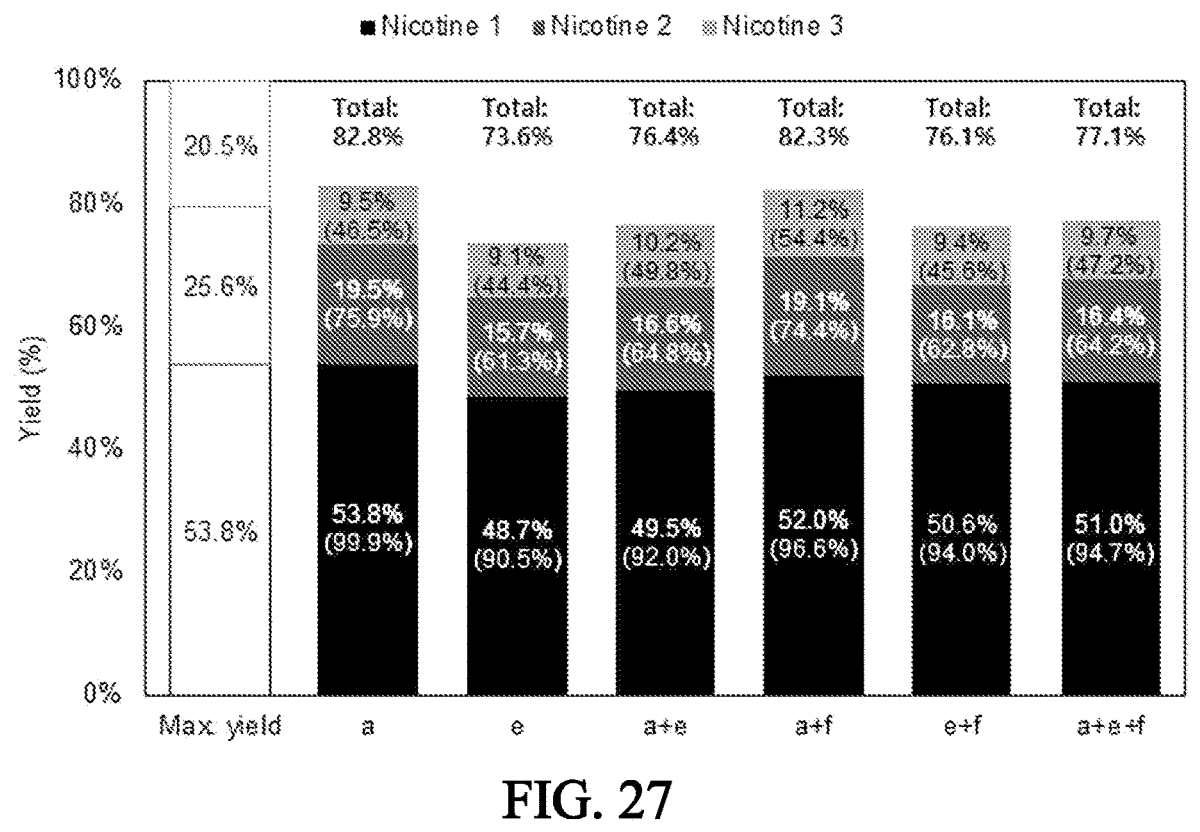

FIG. 27 illustrated nicotine yield amounts for each perforation position condition. The yield rate was highest in the condition of the perforation (a), and decreased by 9.2% p when using (e). In addition, the (a+e) condition was intermediate between (a) and (e), but closer to (c). In addition, when (f) was added to each condition, the high nicotine yield in (a) decreased, and the low yield in (c) and (a+e) increased. This coincided with the temperature distribution trend inside the medium. Therefore, even in terms of the total nicotine yield rate, (a) was the optimal condition, and it was confirmed that using both (e) and (f) perforations had a negative effect.

4. Final Conclusion

Conclusion of Combustible Heat Source Cigarette Design Examination

In Embodiment, computational analysis including flow and heat transfer was performed on the 3D model of the cigarette, and the amount of nicotine generation was predicted based on the temperature distribution of the tobacco medium. The main conclusions were as follows.

The temperature of the tobacco medium was high as the area of the triply laminated paper (rear) increased, and the amount of nicotine generation was also increased. The perforation cooled the front portion of the medium when positioned near the barrier (position (a) in the analysis condition), but diffused the heat to the rear side to help in nicotine generation.

| Explanation of Reference Numerals and Symbols | |
| --- | --- |
| 100: Heat conducting wrapper | 101: First insulating layer, second insulating layer |
| 102: Metal layer | 103: Cigarette paper |
| 200: Carbon heat source | 300: Barrier |
| 400: Medium | 500: Final outer cover |
| 600: Tube filter | 700: First fluid |
| 800: Second fluid | 900: Ace filter |
| 1000: Paper pipe | 100a: Front length |
| 100b: Rear length | 103a: Cigarette paper length |
| 200a: Heat source length | 10: First perforation |
| 20: Second perforation | 30: Third perforation |

As described above, although the embodiments have been described by the restricted drawings, various modifications and variations can be applied on the basis of the embodiments by those skilled in the art. For example, even if the described techniques are performed in a different order from the described method, and/or components such as a system, a structure, a device, a circuit, and the like described above are coupled or combined in a different form from the described method, or replaced or substituted by other components or equivalents, an appropriate result can be achieved.

Therefore, other implementations, other embodiments, and equivalents to the appended claims fall within the scope of the claims to be described below.

The invention claimed is:

1. A carbon heat source-applied cigarette comprising:
a carbon heat source, a medium, a heat conducting wrapper wrapping the carbon heat source and a part of the medium, and cigarette paper wrapping a part of the medium where the heat conducting wrapper is not present,
an outer cover, and
a barrier formed between the carbon heat source and the medium,
wherein the heat conducting wrapper is a laminate including a first insulating layer, a metal layer, and a second insulating layer in this order, and
the first insulating layer is in direct contact with the carbon heat source and the part of the medium wrapped by the heat conducting wrapper.

2. The carbon heat source-applied cigarette of claim 1, wherein in the heat conducting wrapper, a ratio of a length of a front portion wrapping the carbon heat source and a length of a rear portion wrapping a part of the medium is 1:1.1 to 3.

3. The carbon heat source-applied cigarette of claim 1, wherein in the heat conducting wrapper, a length of a rear portion wrapping a part of the medium is longer than a length of a front portion wrapping the carbon heat source.

4. The carbon heat source-applied cigarette of claim 1, wherein perforations are formed in an outer circumferential surface of the medium.

5. The carbon heat source-applied cigarette of claim 4, wherein the perforations are formed in positions between 0.5 to 3 mm from the barrier.

6. The carbon heat source-applied cigarette of claim 1, wherein the first insulating layer and the second insulating layer are made of a paper material, and the metal layer is made of an aluminum material.

7. The carbon heat source-applied cigarette of claim 1, wherein the heat source has a length of 5 to 15 mm, and the cigarette paper has a length of 3 to 8 mm.

8. The carbon heat source-applied cigarette of claim 1, wherein the barrier has a thickness of 0.1 to 0.3 mm.

* * * * *